United States Patent
Holmdahl et al.

(10) Patent No.: US 11,383,173 B2
(45) Date of Patent: Jul. 12, 2022

(54) AUTOMATICALLY GENERATED SEARCH SUGGESTIONS

(71) Applicant: Roblox Corporation, San Mateo, CA (US)

(72) Inventors: Eric Holmdahl, San Francisco, CA (US); Nikolaus Sonntag, Foster City, CA (US)

(73) Assignee: Roblox Corporation, San Mateo, CA (US)

( * ) Notice: Subject to any disclaimer, the term of this patent is extended or adjusted under 35 U.S.C. 154(b) by 170 days.

(21) Appl. No.: 16/983,509

(22) Filed: Aug. 3, 2020

(65) Prior Publication Data

US 2022/0035868 A1 Feb. 3, 2022

(51) Int. Cl.
| | |
|---|---|
| A63F 13/85 | (2014.01) |
| G06F 16/9032 | (2019.01) |
| G06F 16/9535 | (2019.01) |
| A63F 13/67 | (2014.01) |
| A63F 13/35 | (2014.01) |
| G06N 20/00 | (2019.01) |
| A63F 13/795 | (2014.01) |

(52) U.S. Cl.
CPC .............. *A63F 13/85* (2014.09); *A63F 13/35* (2014.09); *A63F 13/67* (2014.09); *A63F 13/795* (2014.09); *G06F 16/90324* (2019.01); *G06F 16/9535* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 11,036,801 B1* | 6/2021 | Boteanu | G06Q 30/0631 |
| 2018/0150552 A1* | 5/2018 | Wang | G06N 20/20 |
| 2021/0248192 A1* | 8/2021 | Lu | G06F 16/953 |
| 2021/0326371 A1* | 10/2021 | Bui | G06F 40/284 |

OTHER PUBLICATIONS

"fastText," 2020, 4 pages.
Edizel, et al., "Misspelling Oblivious Word Embeddings," retrieved from Internet: https://arxiv.org/pdf/1905.09755.pdf, 2019, 9 pages.

* cited by examiner

*Primary Examiner* — Jason T Yen
(74) *Attorney, Agent, or Firm* — IP Spring

(57) ABSTRACT

Some implementations relate to methods and computer-readable media to automatically generate search suggestions. In some implementations, a method includes receiving search session data for a plurality of search sessions, each search session comprising a plurality of search terms input by a respective user. The method further includes, for each search session, identifying that a particular search term of the plurality of search terms is followed by a gameplay session of a particular game of a plurality of games of an online gaming platform, determining that the particular search term is a successful term when the particular search term is a last search term in the sequence, and in response to the determining, adding the search session data to a training corpus. The method further includes applying a machine learning algorithm to the training corpus to generate a plurality of embeddings of search terms.

20 Claims, 12 Drawing Sheets

FIG. 4

AUTOMATICALLY GENERATED SEARCH SUGGESTIONS

TECHNICAL FIELD

Implementations relate generally to computer-based gaming, and more particularly, to methods, systems, and computer readable media to automatically generate search suggestions.

BACKGROUND

Some online gaming platforms enable users to connect with each other, interact with each other (e.g., within a game), create games, and share information with each other via the Internet. Users of online gaming platforms may participate in multiplayer gaming environments (e.g., in virtual three-dimensional environments), design characters and avatars, decorate avatars, exchange virtual items/objects with other users, communicate with other users using audio or text messaging, and so forth.

Users may browse and/or search for games on the online gaming platform based on their interests to discover suitable games for playing. For example, users may browse games by game title (e.g. "Jailbreak," "Work at a Pizza Place," 'Theme Park Tycoon," etc.), categories (e.g., action, racing, puzzle, strategy, popular, trending, new, etc.), keywords or concepts (e.g., "car chase, "board game," "sports game," etc.), etc.

SUMMARY

Implementations described herein relate to generation of search suggestions. In some implementations, a computer-implemented method includes receiving search session data for a plurality of search sessions, each search session comprising a plurality of search terms input by a respective user. In some implementations, the plurality of search terms of the search session are in a sequence.

In some implementations, the method further includes, for each search session, identifying that a particular search term of the plurality of search terms is followed by a gameplay session of a particular game of a plurality of games of an online gaming platform, determining that the particular search term is a successful term when the particular search term is a last search term in the sequence, and in response to the determining, adding the search session data to a training corpus.

In some implementations, the method includes applying a machine learning algorithm to the training corpus to generate a plurality of embeddings of search terms, each embedding corresponding to a particular search term of the plurality of search terms.

In some implementations, identifying that the particular search term of the plurality of search terms is followed by the gameplay session of the particular game includes detecting that the user engaged in the gameplay session of the particular game for at least a threshold time duration.

In some implementations, the method further includes selecting a plurality of top embeddings, wherein the plurality of top embeddings is a subset of embeddings of search terms of the plurality of search terms.

In some implementations, the method further includes receiving search input that includes a fresh search term, generating a query embedding based on the fresh search term, comparing the query embedding with the plurality of top embeddings to obtain one or more search results, each search result indicative of a corresponding game of the plurality of games, and providing the search results in response to the search input.

In some implementations, identifying that the particular search term of the plurality of search terms is followed by the gameplay session of the particular game includes detecting that the user purchased an item associated with the particular game, provided a rating for the particular game, or customized an avatar in the particular game.

In some implementations, each term of the plurality of search terms is associated with a respective timestamp, and a difference in timestamps associated with each pair of consecutive search terms is less than a threshold difference.

In some implementations, applying the machine learning algorithm includes applying the machine learning algorithm to a plurality of n-grams constructed from the plurality of search terms. In some implementations, applying the machine learning algorithm includes shuffling the search terms associated with the search session prior to applying the machine learning algorithm.

In some implementations, each embedding is a multi-dimensional numerical feature vector associated with the search term. In some implementations, each embedding has a dimension between about 100 and about 400.

In some implementations, determining that the particular search term is a successful term includes determining that the particular search term is a last search term in the sequence and when no other search term of the plurality of search terms is followed by the gameplay session.

In some implementations, embeddings of search terms that are followed by a gameplay session of the same game have a cosine similarity greater than embeddings of search terms that are followed by gameplay sessions of different games.

In some implementations, a computer-implemented method includes receiving a search term input by a user, generating a query embedding for the search term input, calculating a respective cosine similarity between the query embedding and a plurality of top embeddings, identifying one or more top embeddings that are within a threshold cosine similarity from the query embedding, and providing search results that include games associated with the one or more top embeddings.

In some implementations, providing search results includes providing a user interface that includes the games associated with the one or more top embeddings sorted based on the cosine similarity.

In some implementations, the method further includes prior to generating the query embedding for the search term input, verifying that a click through rate associated with the search term input meets a predetermined threshold. In some implementations, each query embedding is a multi-dimensional numerical feature vector associated with the search term input.

Some implementations include a non-transitory computer-readable medium comprising instructions that, responsive to execution by a processing device, causes the processing device to perform operations comprising receiving a search term input by a user, generating a query embedding for the search term input, calculating a respective cosine similarity between the query embedding and a plurality of top embeddings, identifying one or more top embeddings that are within a threshold cosine similarity from the query embedding, and providing search results that include games associated with the one or more top embeddings.

In some implementations, the operations further include providing search results comprising providing a user interface that includes the games associated with each of the one or more top embeddings sorted based on the cosine similarity.

In some implementations, the operations further include prior to generating the query embedding for the search term input, verifying that a click through rate associated with the search term input meets a predetermined threshold. In some implementations, each query embedding is a multi-dimensional numerical feature vector associated with the search term input.

BRIEF DESCRIPTION OF THE DRAWINGS

FIG. 4 illustrates search stream data obtained from user-performed searches, in accordance with some implementations.

DETAILED DESCRIPTION

Figure 1:
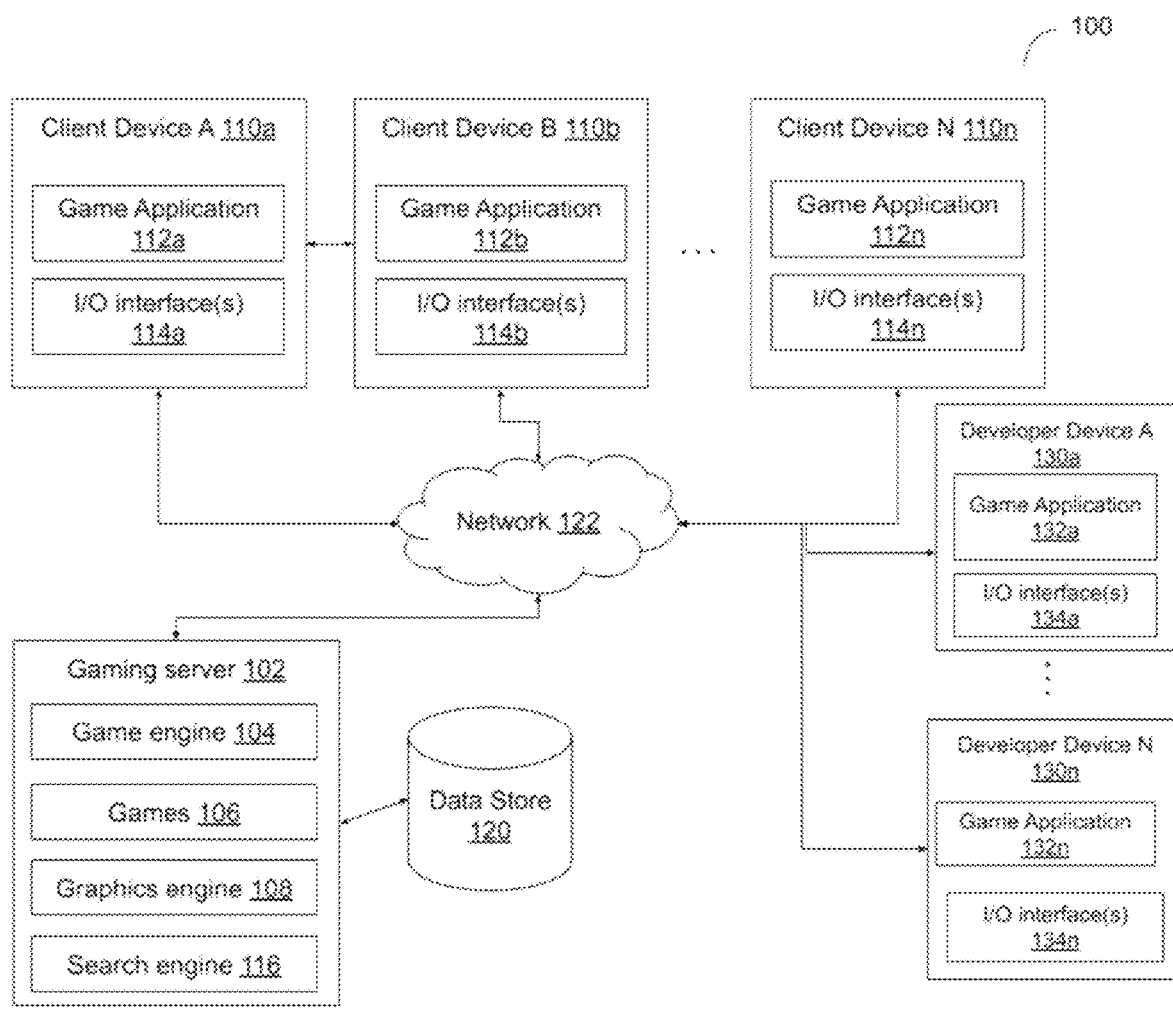
FIG. 1 is a diagram of an example system architecture and environment to generate search suggestions, in accordance with some implementations.

In the following detailed description, reference is made to the accompanying drawings, which form a part hereof In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be implemented in connection with other implementations whether or not explicitly described.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

An online gaming platform may also allow users (developers) of the platform to create new games and/or characters. For example, users of the online gaming platform may be enabled to create, design, and/or customize new characters (avatars), new animation packages, and make them available to other users.

Users may play games in gameplay sessions as solo users, and/or in groups. Multiple instances of gameplay sessions of a game may be initiated at the same time, and at different times by a player or groups of players. A user may participate in multiple gameplay sessions of the same game or participate in gameplay sessions of different games at the same time. Users may include playing participants as well as observer (viewer) participants. During gameplay sessions, participants may communicate with one another via a variety of communication channels (ways) such as text messaging, group chats (e.g., publicly viewable chats), voice messages, etc.

Games may be categorized and/or indexed based on various factors such as the game type, game objective, gameplay style, etc. In some implementations, games can be organized by one or more of gameplay characteristics, objective (of the game) type, subject type (for example, sports, challenge, action, or racing), etc.

Users (players) may discover games to play by browsing a game catalog or by performing a search. The search may be performed by game name or keyword, by game category, etc. The user may select a game they wish to play based on a list of games displayed in response to the search. In some implementations, games likely of interest to the player are surfaced and displayed to the user, for example, at a time of login to the online gaming platform or resumption of a session at the online gaming platform by a player.

When a user enters search terms into a search engine on the online gaming platform, they can mis-spell search terms. For example, an online gaming platform may have a large number, e.g., millions of users from around the world. Some users may be unable to spell terms such as game names, keywords, categories, etc. due to various factors. For example, if game names are in a particular language (e.g., English) that a user does not understand (e.g., due to being a non-native English speaker), the user may enter search terms that are misspelled. In another example, when the user is a language learner (e.g., a young user that is in primary or middle school, or a user that is learning the particular language), the user may misspell search terms. For example, users may use a spelling for the term that appears phonetically correct to them (e.g., based on their native language, based on how the term sounds, etc.), but which may not be the correct spelling of the term as spelled in the game title, game description, etc.

When a user misspells a search term and the intended game is not returned/displayed to the user via the online gaming platform, the user may attempt to search for the intended game using a different spelling, recognizing that the earlier spelling may have been a typographical error/incorrect spelling, etc. This can result in multiple user queries for the same intent, resulting in wastage of computational resources to perform a new search for each query. Further, this can result in user frustration when the search engine fails to return the desired game, and can cause a loss of potential revenue for the online gaming platform due to the user not playing the game and having lower engagement with the platform.

In some cases, based on an incorrectly spelled search term, a game different from that intended by the user may be returned as a search result to the user, e.g., the different game may have a phonetically similar name that is closer to the search term than the name of the intended game. If the user (player) initiates a game session based on such a search result, a gameplay session may be an unsuccessful session in that the player initiates playing, only to realize that this was not the game they intended to play, and terminates the gameplay session. Unsuccessful gameplay sessions can also waste computational resources of the online gaming platform, besides providing a poor user experience.

In some cases, users may also search for games based on a game genre or category. For example, a user may enter search terms such as "sports," "shooting game," and based on returned results on the platform, eventually play a specific game from the genre/category.

Further, online gaming platforms may have their own vocabulary, e.g., names of games, keywords, or other terms associated with games may not be present in any language dictionary and/or may be specific to the online gaming platform. This may limit the applicability of available language dictionaries as well as spelling correction techniques to correct a misspelled query, or in some cases, may result in inaccuracies in the search results.

Game players and online gaming platform owners benefit from a reduced number of user searches per successful gameplay session. Automatically generated search suggestions can be utilized as input to recommender models, e.g. machine learning models, utilized on the online gaming platform. For example, the recommender models can generate game recommendations for users based on the entered search terms. A technical problem for online gaming platform operators is the accurate and efficient discoverability of games across the online gaming platform(s).

Some implementations disclosed herein automatically generate search suggestions based on the entered search terms. The search suggestions may be generated based on previously entered game search query reformulations that eventually lead to a successful gameplay session. The search suggestions can be utilized to enable users to play games on the online gaming platform. A technical problem for online gaming platform operators is the efficient discoverability of games across the online gaming platform(s).

FIG. 1 illustrates an example system architecture 100 of an online gaming platform, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online gaming server 102, data store 120, client devices 110a, 110b, and 110n (generally referred to as "client device(s) 110" herein), and developer devices 130a and 130n (generally referred to as "developer device(s) 130" herein). Gaming server 102, data store 120, client devices 110, and developer devices 130 are coupled via network 122. In some implementations, client devices(s) 110 and developer device(s) 130 may refer to the same or same type of device.

Online gaming server 102 can include, among other things, a game engine 104, one or more games 106, and graphics engine 108. A client device 110 can include a game application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a game application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online gaming server 102 can include a server having one or more computing devices (e.g., a cloud computing system, a rackmount server, a server computer, cluster of physical servers, etc.). In some implementations, the online gaming server 102 may be an independent system, may include multiple servers, or be part of another system or server.

In some implementations, the online gaming server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 102 and to provide a user with access to online gaming server 102. The online gaming server 102 may also include a website (e.g., a webpage) or application back-end software that may be used to provide a user with access to content provided by online gaming server 102. For example, users may access online gaming server 102 using the game application 112 on client devices 110.

In some implementations, online gaming server 102 may be a type of social network providing connections between users or a type of user-generated content system that allows users (e.g., end-users or consumers) to communicate with other users on the online gaming server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). With user permission, a record of some or all user communications may be stored in data store 120 or within games 106. The data store 120 may be utilized to store chat transcripts (text, audio, images, etc.) exchanged between players.

In some implementations, the chat transcripts are generated via game application 112 and/or game application 132 or and are stored in data store 120. When the user permits storage of chat transcripts, the chat transcripts may include the chat content and associated metadata, e.g., text content of chat with each message having a corresponding sender and recipient(s); message formatting (e.g., bold, italics, loud, etc.); message timestamps; relative locations of user avatar(s) within a virtual game environment, accessories utilized by game users, etc. In some implementations, the chat transcripts may include multilingual content, and messages in different languages from different gameplay sessions of a game may be stored in data store 120.

Users are provided with controls to determine what chat information is stored and how long the information is stored. For example, a user can select to set the chat information storage to expire at certain times, e.g., at the end of a game session, upon logging out from the online gaming platform, every 24 hours, every week, etc. In some implementations, e.g., when the user denies permission, or when the chat is encrypted, no chat data may be stored. In these implementations, chat metadata such as start and end times, user counts, user identifiers, game and game session identifiers, etc. may be stored, as permitted by the user.

In some implementations, chat transcripts may be stored in the form of conversations between users based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 102 may be a virtual gaming server. For example, the gaming server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a game (e.g., 106) or the presentation of the interaction on a display or other output device (e.g., 114) of a client device 110.

In some implementations, a game 106 can include an electronic file that can be executed or loaded using software, firmware or hardware configured to present the game content (e.g., digital media item) to an entity. In some implementations, a game application 112 may be executed and a game 106 rendered in connection with a game engine 104. In some implementations, a game 106 may have a common set of rules or common goal, and the environment of a game 106 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 106 may be collectively referred to as a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 102 can host one or more games 106 and can permit users to interact with the games 106 using a game application 112 of client devices 110. Users of the online gaming server 102 may play, create, interact with, or build games 106, communicate with other users, and/or create and build objects (e.g., also referred to as "item(s)" or "game objects" or "virtual game item(s)" herein) of games 106.

For example, in generating user-generated virtual items, users may create characters, decoration for the characters, one or more virtual environments for an interactive game, or build structures used in a game 106, among others. In some implementations, users may buy, sell, or trade game virtual game objects, such as in-platform currency (e.g., virtual currency), with other users of the online gaming server 102. In some implementations, online gaming server 102 may transmit game content to game applications (e.g., 112). In some implementations, game content (also referred to as "content" herein) may refer to any data or software instructions (e.g., game objects, game, user information, video, images, commands, media item, etc.) associated with online gaming server 102 or game applications. In some implementations, game objects (e.g., also referred to as "item(s)" or "objects" or "virtual objects" or "virtual game item(s)" herein) may refer to objects that are used, created, shared or otherwise depicted in game applications 106 of the online gaming server 102 or game applications 112 of the client devices 110. For example, game objects may include a part, model, character, accessories, tools, weapons, clothing, buildings, vehicles, currency, flora, fauna, components of the aforementioned (e.g., windows of a building), and so forth.

It may be noted that the online gaming server 102 hosting games 106, is provided for purposes of illustration. In some implementations, online gaming server 102 may host one or more media items that can include communication messages from one user to one or more other users. With user permission and express user consent, the online gaming server 102 may analyze chat transcripts data to improve the online gaming platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 106 may be associated with a particular user or a particular group of users (e.g., a private game), or made widely available to users with access to the online gaming server 102 (e.g., a public game). In some implementations, where online gaming server 102 associates one or more games 106 with a specific user or group of users, online gaming server 102 may associated the specific user(s) with a game 106 using user account information (e.g., a user account identifier such as username and password).

In some implementations, online gaming server 102 or client devices 110 may include a game engine 104 or game application 112. In some implementations, game engine 104 may be used for the development or execution of games 106. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game applications 112 of client devices 110, respectively, may work independently, in collaboration with game engine 104 of online gaming server 102, or a combination of both.

In some implementations, both the online gaming server 102 and client devices 110 may execute a game engine (104 and 112, respectively). The online gaming server 102 using game engine 104 may perform some or all the game engine functions (e.g., generate physics commands, rendering commands, etc.), or offload some or all the game engine functions to game engine 104 of client device 110. In some implementations, each game 106 may have a different ratio between the game engine functions that are performed on the online gaming server 102 and the game engine functions that are performed on the client devices 110. For example, the game engine 104 of the online gaming server 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 102 and client device 110 may be changed (e.g., dynamically) based on gameplay conditions. For example, if the number of users participating in gameplay of a particular game 106 exceeds a threshold number, the online gaming server 102 may perform one or more game engine functions that were previously performed by the client devices 110.

For example, users may be playing a game 106 on client devices 110, and may send control instructions (e.g., user inputs, such as right, left, up, down, user election, or character position and velocity information, etc.) to the online gaming server 102. Subsequent to receiving control instructions from the client devices 110, the online gaming server 102 may send gameplay instructions (e.g., position and velocity information of the characters participating in the group gameplay or commands, such as rendering commands, collision commands, etc.) to the client devices 110 based on control instructions. For instance, the online gaming server 102 may perform one or more logical operations (e.g., using game engine 104) on the control instructions to generate gameplay instruction(s) for the client devices 110. In other instances, online gaming server 102 may pass one or more or the control instructions from one client device 110 to other client devices (e.g., from client device 110a to client device 110b) participating in the game 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 102. In other implementations, the control instructions may be sent from a client device 110 to another client device (e.g., from client device 110b to client device 110n), where the other client device generates gameplay instructions using the local game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that enable a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, the online gaming server 102 may store characters created by users in the data store 120. In some implementations, the online gaming server 102 maintains a character catalog and game catalog that may be presented to users. In some implementations, the game catalog includes images of games stored on the online gaming server 102. In addition, a user may select a character (e.g., a character created by the user or other user) from the character catalog to participate in the chosen game. The character catalog includes images of characters stored on the online gaming server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming server 102 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 102 as well as interact with online gaming server 102 (e.g., play games 106 hosted by online gaming server 102). As such, the game application may be provided to the client device(s) 110 by the online gaming server 102. In another example, the game application may be an application that is downloaded from a server.

In some implementations, each developer device 130 may include an instance of the game application 132, respectively. In one implementation, the game application 132 may permit a developer user(s) to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 132 may be an online gaming server application for users to build, create, edit, upload content to the online gaming server 102 as well as interact with online gaming server 102 (e.g., provide and/or play games 106 hosted by online gaming server 102). As such, the game application may be provided to the client device(s) 130 by the online gaming server 102. In another example, the game application 132 may be an application that is downloaded from a server. Game application 132 may be configured to interact with online gaming server 102 and obtain access to user credentials, user currency, etc. for one or more games 106 developed, hosted, or provided by a game developer.

In some implementations, a user may login to online gaming server 102 via the game application. The user may access a user account by providing user account information (e.g., username and password) where the user account is associated with one or more characters available to participate in one or more games 106 of online gaming server 102. In some implementations, with appropriate credentials, a game developer may obtain access to game virtual game objects, such as in-platform currency (e.g., virtual currency), avatars, special powers, accessories, that are owned by or associated with other users.

In general, functions described in one implementation as being performed by the online gaming server 102 can also be performed by the client device(s) 110, or a server, in other implementations if appropriate. In addition, the functionality attributed to a particular component can be performed by different or multiple components operating together. The online gaming server 102 can also be accessed as a service provided to other systems or devices through appropriate application programming interfaces (APIs), and thus is not limited to use in websites.

In some implementations, online gaming platform 102 may include a search engine 116. In some implementations, the search engine 116 may be a system, application, or module that enables the gaming platform to provide search functionality to users, where the search functionality permits the users to search for games, game-related content or other content within the gaming platform. In some implementations, the search engine 116 may perform one or more of the operations described below in connection with the flowcharts shown in FIGS. 5 and 10.

Figure 2:
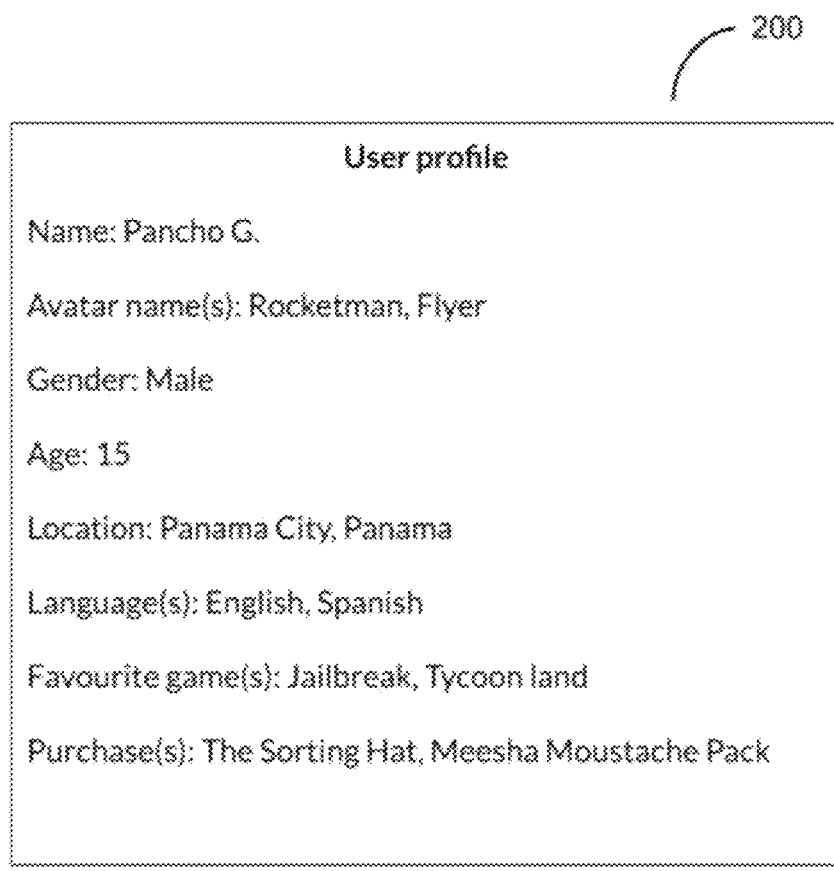
FIG. 2 illustrates an example user profile of a user of an online gaming platform, in accordance with some implementations.

FIG. 2 illustrates an example user profile of a user of an online gaming platform, in accordance with some implementations.

User profile 200 includes information about the user obtained with user permission and express consent, such as user name, avatar name(s), gender, age, location, language(s) utilized by the game user, favorite game(s), etc. The user profile may also include parameters related to the user's activity on the online gaming platform. For example, such parameters may include searches performed by the user, search terms used, games played, a number of game sessions played for a game, session durations, games played by a user for at least a threshold amount of time, whether the game player has purchased a game item associated with the game or otherwise available on the online gaming platform, whether the game player is a platform subscriber, whether the user has configured an avatar for use on the online gaming platform, etc.

The user profile information may be stored locally on client device 110, developer device 130, and/or data store 120. Users of the online gaming platform are provided with options to select whether and what information about the user is stored and how that information is used. The user can choose to deny permission to store certain information. Further, storage and use of user information is in accordance with applicable regulations. For example, information about a user's gameplay sessions and/or other activity on the online gaming platform may be stored for a limited period of time, e.g., one day, one week, etc. and purged upon expiry of the limited period. In some implementations, certain information may be stored after anonymization such that the user associated with the information cannot be identified. For example, search queries may be stored in search session data that may be associated with a randomized identifier, rather than a particular identifier. Gameplay information resulting from a search session may be associated with the same randomized identifier. Certain information may be aggregated or otherwise processed prior to storage and/or use such that the information is not specific to a particular user of the online gaming platform.

Figure 3:
FIG. 3 illustrates example user interfaces depicting searches conducted by a user of an online gaming platform and corresponding results, in accordance with some implementations.

FIG. 3 illustrates example user interfaces depicting searches conducted by a user of an online gaming platform and corresponding results, in accordance with some implementations.

In these illustrative examples, each user interface (UI) includes an element for the user to input (enter) one or more search term(s) and displays a list of games (or game icons) based on the search term(s). The UI view can enable a user to browse for games based on their entered search term.

For example, FIG. 3 depicts user interfaces 302a-302d that illustrate sequential searches conducted by a user at times t1-t4 respectively. As seen in FIG. 3, at an initial time t1, the user enters "Jailprek" as a search term (query) and a results section is displayed that indicates that no game matching the search term was found ("Sorry—no game located"). At subsequent times t2 and t3, illustrated respectively in user interface 302b and 302c, the user reformulates the search query and attempts to correct their search by entering two more unsuccessful terms ("Gelprek" and "Jelprek"). Lastly, at a still later time t4, illustrated in user interface 302d, the user reformulates the search query again, and enters the search term "Jailbreak" which corresponds to an available game "Jailbreak" shown in the results section. Based on the search term "Jailbreak," the search engine (for example, search engine 116 described with reference to FIG. 1) returns a result ("Jailbreak—a game about breaking out of prison"). The user is provided with an option to select and play the returned (suggested) game.

The sequence of search terms illustrated in FIG. 3 is one example where a user attempts to search for an intended game ("Jailbreak") but encounters repeated failures due to misspellings. As can be appreciated, some of the misspellings (e.g., "Gelprek") are far from the correct term, which may be due to the user's limited understanding of English. For example, certain users may not know when to use the letters "G" and "J" since they may sound alike in many words. In another example, the word "break" can be misspelled based on choosing the wrong letter (e.g., "p" instead of "b") and/or misspelling the word (e.g., as "brek," "brake," "braek," etc.). In some cases, the error patterns may be similar for certain users. For example, users that speak Spanish as their native language may consistently interchange the English language letters "H" and "J" since these are associated with similar sounds in Spanish.

In this illustrative example, the user selects element "Proceed to play" and a corresponding signal is provided (for example, to game engine 104) to enable the user to play the selected game. In some implementations, selecting a game may result in the game being streamed (for example, via gaming server 102 and application 112) to the user or the game being made available to the user for download.

Figure 4:
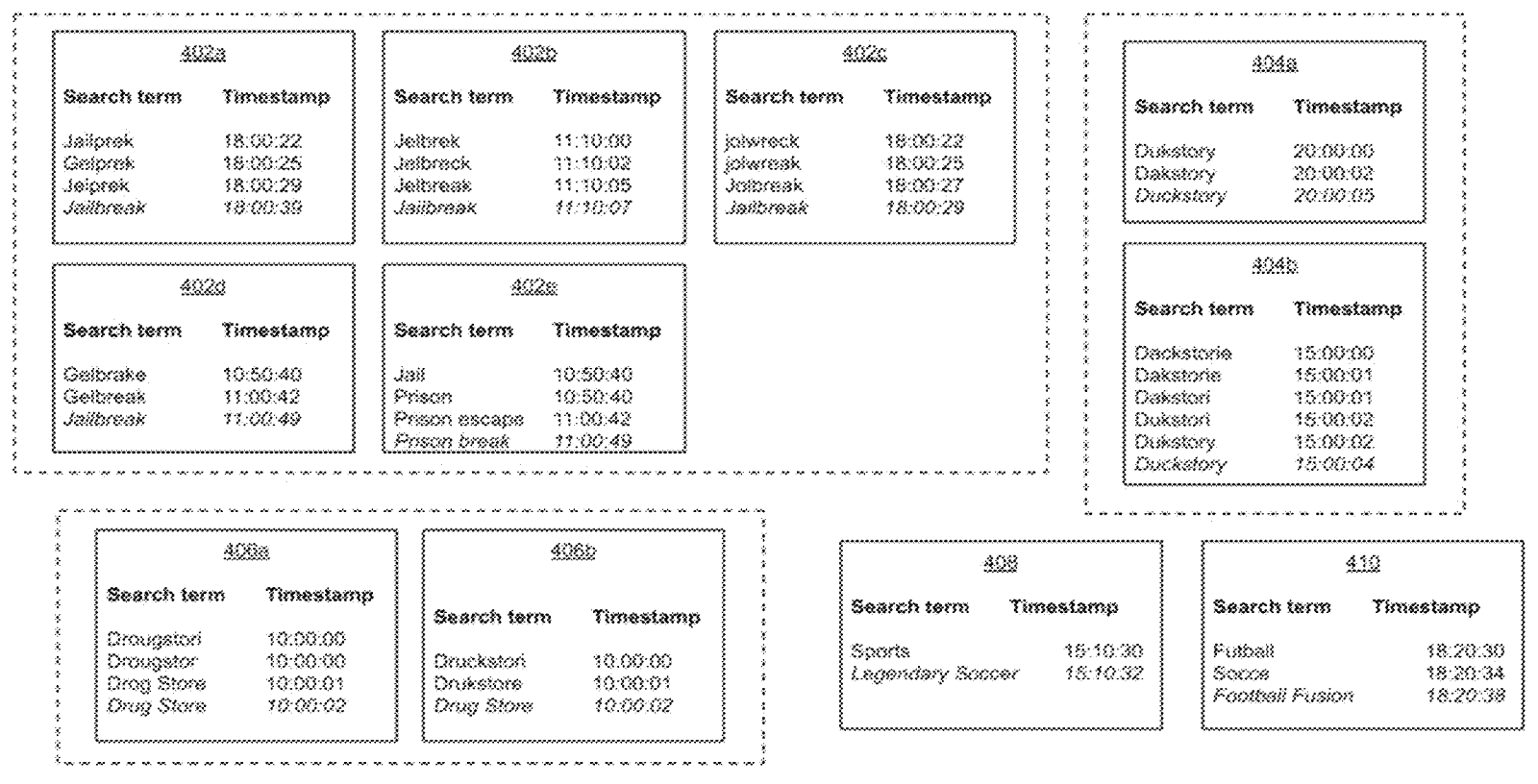

FIG. 4 illustrates search stream data obtained from user-performed searches, in accordance with some implementations.

The search stream data (also referred to as user search stream data) may be stored, for example, in data store 120 described with reference to FIG. 1. The search stream data includes search terms utilized by users during searches conducted using the online gaming platform, for example, using gaming server 102 and/or search engine 116. The user search data may include search terms utilized by different users of the online gaming platform, search terms utilized in different languages, and search terms input by users situated in different locations.

The game search data includes sequences of search terms input (entered) by users where a last search term in the sequence led to a successful gameplay session of a game along with the corresponding timestamps when the search terms were input by the users. For example, FIG. 4 depicts a plurality of sequences of search terms that led to a successful gameplay session of a game "Jailbreak" in response to "Jailbreak" being the final search term in the sequence. Sequences of search terms utilized at different times, and by the same and/or different users are obtained. For example, search data stream 402a includes search terms "Jailprek," "Gelprek," "Jelprek," and "Jailbreak," entered by the users at times 18:00:22, 18:00:25, 18:00:29, and 18:00:39, respectively. The italicized search term indicates that the user played the game subsequent to that search term.

Game search data is obtained over multiple searches conducted by one or more users of the online gaming platform. For example, search data streams 402b-402e depict search terms utilized at different times by one or more users that were subsequently followed by a gameplay session of the game "Jailbreak."

The game search data includes search terms utilized for different games on the online gaming platform. For example, FIG. 4 depicts search data streams with sequences of search terms 404a-404b that were followed by a successful gameplay session of "Duckstory," search data streams that include sequences of search terms 406a-406b that were followed by a successful gameplay session of "Drug Store," and sequences of search terms 410 depict a search sequence that was followed by a successful gameplay session of "Football Fusion."

Search data streams can also include sequences of terms that are thematic (category based) search queries. For example, search data dream 408 includes a search term "Sports" that is followed by a gameplay session of "Legendary Soccer."

It may be noted that sequences depicted in FIG. 4 are successful sequences based in search query reformulations by a user where the user played an intended game by finally arriving at the successful search term while initially entering misspelled search terms.

Different types of search sequences may occur on the online gaming platform. It will be appreciated that while FIG. 4 illustrates search terms in English and relatively simple terms, search terms can be in any language and can have any length/complexity. Further, in the sequences of FIG. 4, it is presumed that the search engine has limited capability to correct misspellings when matching, e.g., the search engine may use a particular language dictionary that may exclude terms that are specific to the online gaming platform, or use matching techniques that do not take into account platform-specific terms as well as the various different ways in which users may misspell words (e.g., due to a lack of familiarity with the language, limited language ability, etc.).

Figure 5:
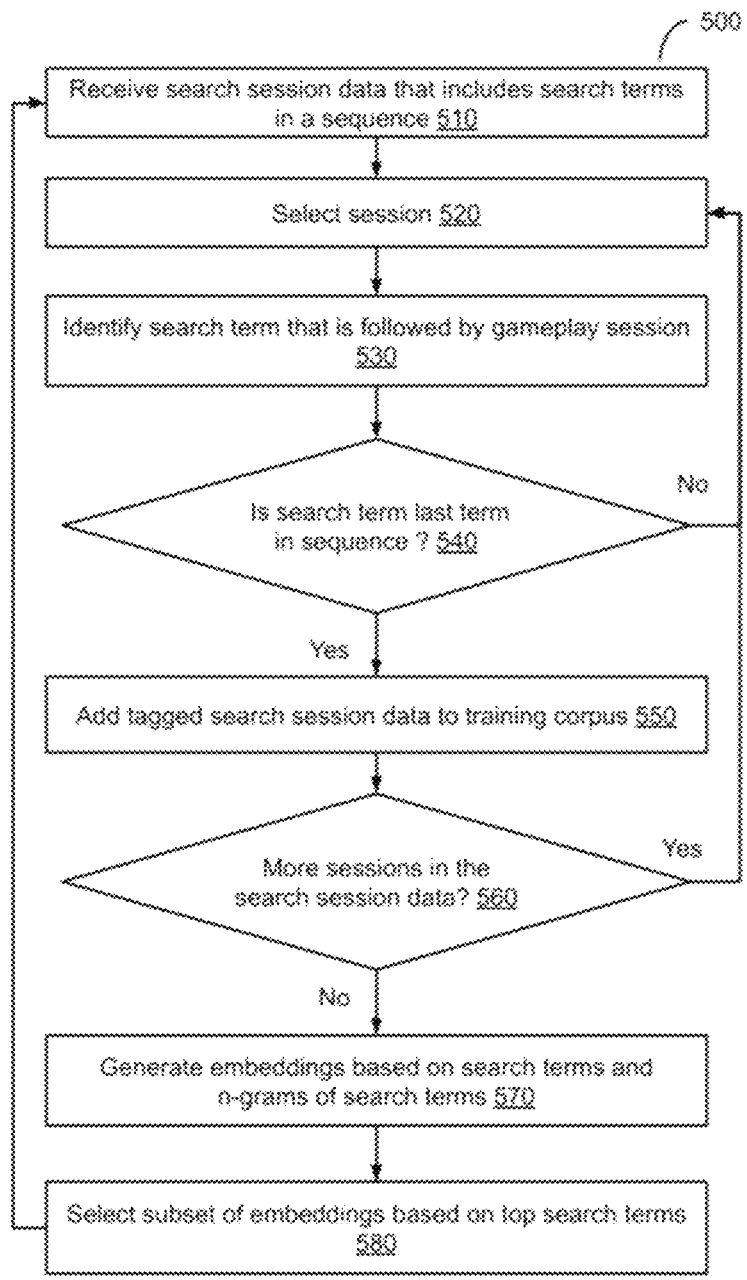
FIG. 5 is a flowchart illustrating an example method to generate embeddings of search terms, in accordance with some implementations.

FIG. 5 is a flowchart illustrating an example method to generate embeddings of search terms, in accordance with some implementations.

In some implementations, method 500 can be implemented, for example, on gaming server 102 described with reference to FIG. 1. In some implementations, some or all of the method 500 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a database 120 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., number of search sessions conducted by users increase by a certain amount, a threshold level of search activity being met, a predetermined time period having expired since the last performance of method 500, and/or one or more other conditions occurring which can be specified in settings read by the method.

Method 500 may begin at block 510. At block 510, search session data for a plurality of search sessions is received. The search session data for each search session may include sequences of search terms of a search session input by a respective user.

In some implementations, method 500 may be utilized for search session data corresponding to search sessions within a predetermined time period. For example, in some implementations, search session data for the previous 30 days may be received. In some implementations, other predetermined time periods may be utilized, e.g. 1 day, 10 days, 60 days, or 100 days of search session data. In some implementations, search session data from between 1 day and 1000 days may be received. In some implementations, a total number of game search query reformulations may be specified.

Block 510 may be followed by block 520, where one of the search sessions is selected. Block 520 may be followed by block 530.

At block 530, a search term in the search session data that is followed by a gameplay session of a game of the online gaming platform is identified. Such a search term may be referred to as a successful search term. In some implementations, gameplay session data is analyzed to detect that the user engaged in the gameplay session of the particular game for at least a threshold time duration.

In some implementations, a particular search term that is followed by a gameplay session is identified as a successful search term when a gameplay session is successfully launched from the results provided in response to the search term and is played by the user. In some implementations, the successful search term may be a term that is included in a title or other descriptor associated with a game In some implementations, a gameplay session may be considered successfully launched and played if a time duration of play of the gameplay session meets a predetermined threshold time, e.g., 5 minutes. The threshold time may be configurable, and may be based on the game, type of game, category of game, etc. For example, games that are expected to be played only for a relatively short duration may utilize a smaller threshold gameplay time to be considered as a successful gameplay session, and games expected to be played for a relatively longer duration may utilize a larger threshold gameplay time to be considered a successful gameplay session.

In some implementations, a level of user engagement and/or participation may be utilized to determine that a search term is identified based on a gameplay session. For example, identifying that the particular search term of the plurality of search terms is followed by the gameplay session of the particular game may include detecting that the user purchased an item associated with the particular game, provided a rating for the particular game, or customized an avatar in the particular game.

In some implementations, a search term may be considered a successful search term based on a user click received in response to a returned search result based on a search term.

Block 530 may be followed by block 540. At block 540, it is determined whether the successful search term is the last term in a sequence of search terms in the session data. If the successful search term is the last term in the session data, block 540 is followed by block 550.

If it is determined that the successful search term is not the last search term in the sequence (or if the sequence has no successful search term), block 540 may be followed by block 520 to select another search session from the search session data.

In some implementations, a search term is included in the sequence of search terms based on whether a similarity between each pair of consecutive terms of the plurality of terms meets a similarity threshold. For example, such a threshold may be useful to detect a change in user intent, in which case the search session may be broken up into multiple sessions, each corresponding to a different user intent.

In some implementations, each term of the plurality of search terms is associated with a respective timestamp, and wherein a difference in timestamps associated with each pair of consecutive search terms is less than a threshold difference. For example, timestamps within a short time window (e.g., 2 minutes, 5 minutes) may correspond to a search session that has a single goal (intended game) while longer sessions may correspond to multiple different user intents.

In some implementations, if a particular search session does not meet the criteria (e.g., session corresponds to multiple user intents, or is longer than a time window), the sequence of search terms in the search session may be broken into subsequences based on one or more of search term similarity, time window, result of gameplay, etc. The subsequences may each then be classified as a session and added to the search session data, to replace the original session from which they are derived.

For example, a session that includes the sequence {gelprek, gailprek, dukstori, duckstory} may be broken down into two sessions—{gelprek, gailprek} and {dukstori, duckstory} based on the first two terms meeting the similarity threshold, and the second and the third term not meeting the threshold. In another example, a session that includes the sequence {jailbreak (t1=12:00), jailbrake (t2=17:00), jailbreak (t3=17:01} may be broken into two sessions, one for the first occurrence of the term jailbreak and the second for the sequence {jailbrake, jailbreak} based on a time difference between the first and the second term exceeding a time threshold.

In general, after such processing, each search session (identified in block 520) may include zero (unsuccessful search session) or exactly one successful gameplay session (successful search session) resulting from the search sequence of terms in that session. Further, the unsuccessful search sessions and successful search sessions with a single search term may be excluded from further processing.

At block 550, the search session data (including the sequence of search terms, ending at the successful search term) is added to a training corpus. The search session data may be tagged with the particular game that was successfully played in the gameplay session.

In some implementations, other gameplay session data may also be added to the training corpus. For example, information from the user profile(s) associated with the game such as user location, user language, etc. may also be added to the training corpus. Such data may be used as additional factors in generating clusters of search terms. Block 550 may be followed by block 560.

At block 560, it is determined if there are more sessions to be analyzed in the search session data. If it is determined that there are more sessions to be analyzed in the search session data, block 560 is followed by block 520, else processing continues to block 570.

At block 570, a machine learning algorithm is applied to the training corpus to generate a plurality of embeddings of search terms. Each embedding corresponds to a particular search term of the plurality of search terms. In some implementations, the ML model may be an ML model that utilizes a word embedding architecture that converts words to vectors. For example, the word embedding architecture may be utilized to map words or phrases that appear in the sequences of search terms to vectors of real numbers.

In some implementations, the embeddings may be generated by utilizing unsupervised machine learning techniques. The embedding may be a mathematical, multi-dimensional representation that is generated based on the plurality of search terms in the training corpus. The use of embeddings enables reduction of the dimensionality of the space of search terms, e.g. reducing the relatively large dimensionality of an entire search term space to a relatively smaller dimensionality of the embeddings.

For example, a search term space that includes 30 million unique search terms may be reduced to an embedding space dimensionality of 200 or 300, such that the 200 or 300 dimensioned embedding can be utilized to perform operations such as comparisons, computing similarity/dissimilarity, etc. to identify search terms that are similar, e.g., that correspond to the same or similar user search intent.

In some implementations, search terms that are semantically similar can be identified by determining a cosine similarity between their corresponding embeddings. For example, the embeddings of search terms that are followed by a gameplay session of the same game have a cosine similarity greater than embeddings of search terms that are followed by gameplay sessions of different games.

In some implementations, any suitable machine learning model may be utilized in the machine learning algorithm, e.g., a feedforward neural network, a convolutional neural network, or any other suitable type of neural network.

For example, the search term "jail break" may be represented as a multi-dimensional numeric vector, e.g. [0.75534, 0.2231, . . . , −0.9221]. In some implementations, the embedding may have a dimension between about 100 and about 400. In some implementations, the embedding may have a dimension of about 300. In some implementations, the embedding vectors may have dimensions such as 10, 50, 100, 500, or 1000.

In some implementations, the search terms in the training corpus data are shuffled and passed to a machine learning model, e.g. a fastText model, as a bag of words. In some implementations, the bag of words enables a simplifying representation of the search terms input by users on the platform. In some implementations, the bag of its words disregards search term sequence order but preserves frequency (of occurrence of search terms) signals associated with the search terms.

In some implementations, a set of n-grams are constructed from the plurality of search terms and provided as input to the machine learning algorithm. For example, the search term "jail break" may be deconstructed into constituent n-grams, e.g. 'jail,' 'jail b,' 'brea,' 'reak,' etc. and provided as input to the machine learning algorithm. In some implementations, the machine learning algorithm may deconstruct provided search terms into constituent n-grams, and search terms may be directly provided to the machine learning algorithm.

In some implementations, an order of search terms associated with the search session may be shuffled prior to applying the machine learning algorithm. For example, if the search stream sequence data was [Jailprek, Delprek, Jelprek, Jailbreak], a first input to the machine learning model may be [Jailprek, Delprek, Jelprek, Jailbreak]; another input to the algorithm may be [Jailprek, Jelprek, Delprek, Jailbreak], where the order of search terms "Jelprek" and "Delprek" is interchanged.

In some implementations, search terms from search stream sequences from multiple sessions may be combined prior to applying the machine learning algorithm. This enables training of the machine learning model and the generation of embeddings such that embeddings of search terms that are similar in intent, whether semantically or due to variations in their spelling, have a higher cosine similarity to each other when compared to embeddings of search terms that are dissimilar in intent.

For example, if a first search stream sequence data was [Jail, Prison, Prison escape, Prison break], and a second search stream sequence data was [Gelbrek, Gelbreak, Jailbreak], and both search sessions were followed by successful gameplay sessions of "Jailbreak"; a first input to the machine learning algorithm may be [Gelbrek, Gelbreak, Prison escape, Jailbreak]; a second input to the machine learning algorithm may be [Jail, Prison, Jailbreak]; and a third input to the machine learning algorithm may be [Jail, Prison, Prison escape, Jailbreak]. Based on the provided inputs to the machine learning model, output embeddings for search terms associated with the "Jailbreak" would have a higher cosine similarity than to embeddings of search terms associated with other games.

In some implementations, the training corpus data may be organized into chunks of data that are utilized for training a machine learning algorithm, For example, from search terms included in the training corpus data associated with the game "Jailbreak," groups of 5 or 10 words may be formed, which are then attached to the search term "Jailbreak." The chunks of search terms are provided as training examples to the machine learning model.

In some implementations, the machine learning model may be trained using chunks of data that include a similar number of search terms. In some implementations, the machine learning model may be trained using chunks of data that include 5 terms. In some implementations, the machine learning model may be trained using chunks of data that include 10 terms. In some other implementations, the machine learning model may be trained using chunks of data that include between about 3 terms and about 20 terms. In some implementations, the machine learning model may be trained using chunks of data that include a dissimilar number of search terms.

In some implementations, the training corpus data may be preprocessed before being utilized for training a machine learning algorithm. For example, in some implementations, whitespace(s) at the ends of words and lowercase characters may be trimmed.

In some implementations, spaces may be replaced with underscores or another sequence of characters. In some implementations, multi-word keywords may be processed such that they are utilized as a single word by the machine learning algorithm during training.

Block 570 may be followed by block 580. At block 580, top embeddings, which may be a subset of embeddings are selected based on embeddings associated with the top search queries on the online gaming platform. For example, a subset may be generated (selected) that includes embeddings associated with the top 10, 20, 30, or 100 most successful (popular) search terms on the online gaming platform. In some implementations, the top embeddings may be based on embeddings associated with games with gameplay sessions that meet a threshold number of gameplay sessions.

In some implementations, the subset of selected embeddings may include embeddings of search terms previously entered on the online gaming platform that was followed by one or more games with the greatest number of successful gameplay sessions.

In some implementations, the subset of selected embeddings may include embeddings of search terms previously entered by users and associated with the most popular games on the online gaming platform. In some implementations, the subset of selected embeddings may include embeddings of search terms entered by users and associated with games with the highest user engagement, as measured by duration of gameplay, rated highest by users, highest revenue generation, etc.

In some implementations, the subset of embeddings may be updated at a predetermined frequency, e.g. daily, weekly, monthly, etc. based on updated search activity on the online gaming platform.

Blocks 510-580 can be performed (or repeated) in a different order than described above and/or one or more steps can be omitted.

In some implementations, multiple search session data may be selected at block 520 and blocks 530-580 may be performed in parallel. Performing some blocks in parallel in this manner may reduce the time to create clusters of search terms, e.g., since multiple search sessions are analyzed substantially at the same time. In some implementations, blocks of method 500 may be performed in the sequence shown in FIG. 5.

In some implementations, method 500 may be performed periodically, e.g., once a day, once a week, etc. and clusters may be updated. In some implementations, method 500 may be performed when certain conditions are satisfied, e.g., when a threshold number of new search sessions are obtained that have not been processed previously, e.g. by applying method 500. While FIG. 5 illustrates generation of embeddings, it will be understood that when prior embeddings are available and new search sessions are analyzed, generating embeddings may include updating certain embeddings, e.g., to associate additional search terms, or to remove certain search terms, and/or adding new embeddings to subsets of embeddings.

For example, when new games are made available on the online gaming platform, users may perform searches for the game, and search data from such searches may be assigned to a machine learning algorithm. In some implementations, if a particular game is no longer available on the online gaming platform, the associated embeddings may be removed such that the search terms are no longer associated with the particular game.

Figure 6:
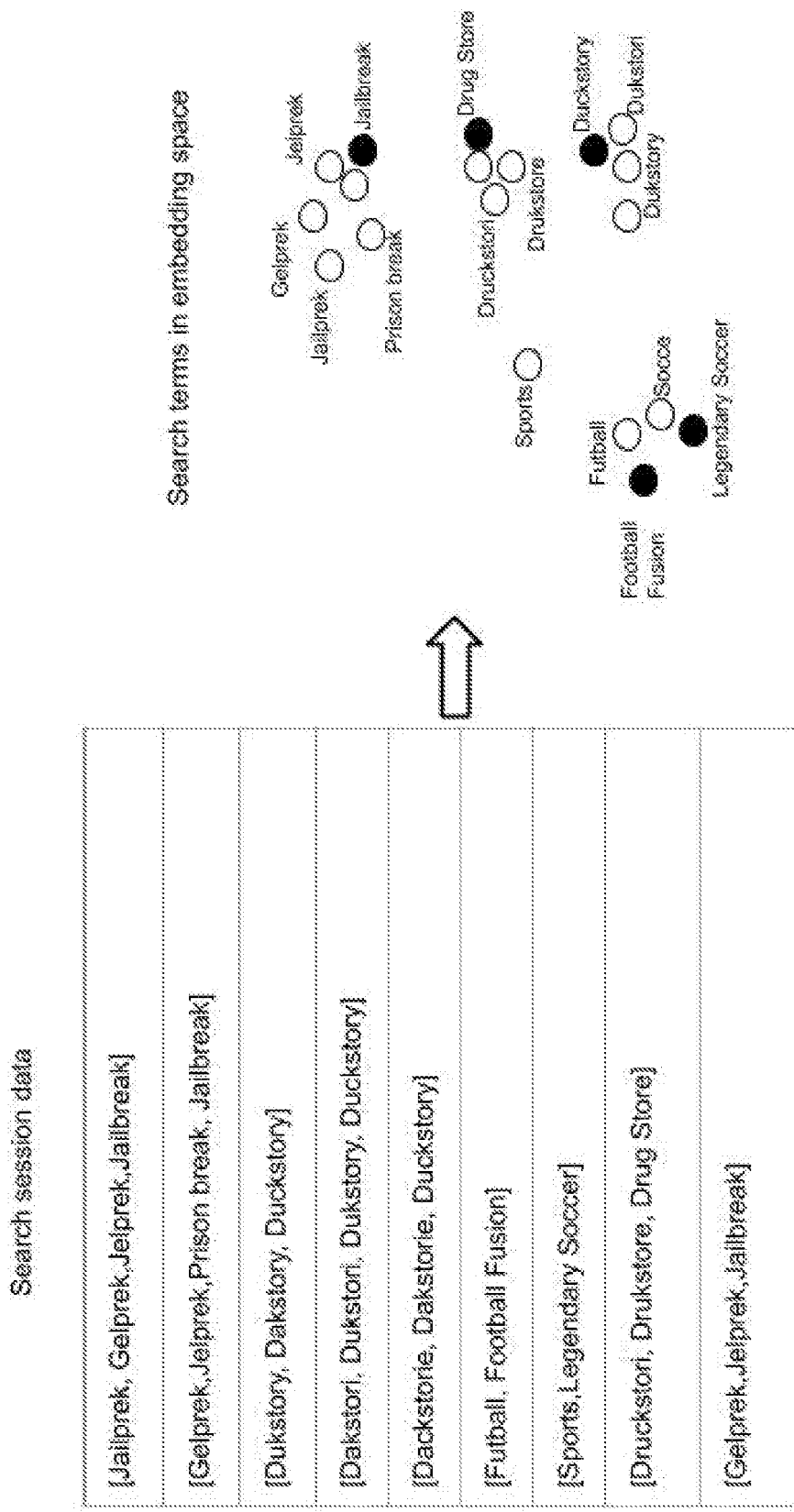
FIG. 6 illustrates examples of embeddings generated from search stream data, in accordance with some implementations.

FIG. 6 illustrates example illustrations of embeddings generated from search stream data, in accordance with some implementations.

FIG. 6 also depicts a visual representation of select example search terms in an embedding space. Search terms that are related and/or similar are closer in embedding space to each other than to search terms that are unrelated and/or dissimilar. For example, search terms "Gelprek," "Jelprek," "Prison break," and "Jailbreak" are more similar to each other than they are to search terms "Druckstori," "Drukstore," or "Drug Store."

As described with reference to FIG. 5, a subset of embeddings is generated based on top performing search terms on the online gaming platform. For example, in this example, the search terms "Jailbreak," "Football Fusion," "Legendary Soccer," "Drug Store," and "Duckstory" are depicted (as a solid circle) as being included in the subset of embeddings. The subset of embeddings may be utilized to resolve new incoming search queries on the online gaming platform.

Figure 7:
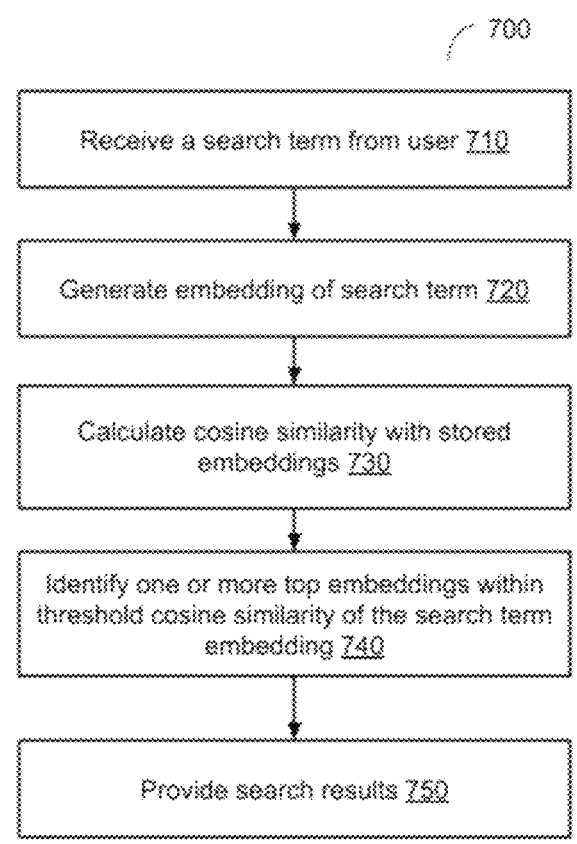
FIG. 7 is a flowchart illustrating an example method to generate search suggestions, in accordance with some implementations.

FIG. 7 is a flowchart illustrating an example method to generate search suggestions, in accordance with some implementations.

FIG. 7 is a flowchart illustrating an example method 700 to generate search suggestions, in accordance with some implementations.

In some implementations, method 700 can be implemented, for example, on gaming server 102 described with reference to FIG. 1. In some implementations, some or all of the method 700 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a database 120 or other storage). In some implementations, different components of one or more servers and/or clients can perform different blocks or other parts of the method 700. In some examples, a first device is described as performing blocks of method 700. Some implementations can have one or more blocks of method 1000 performed by one or more other devices (e.g., other client devices or server devices) that can send results or data to the first device.

Processing begins at block 710, where a search term input by a user is received. For example, a user could enter a search query into a game application 112 executing on a client device 110, which transmits the search query to a server (e.g., gaming server 102) resulting in receiving the search query at the server. The search query can include one or more terms or keywords that a user is searching for in a game or game-related content within an online gaming platform or other system. Block 710 may be followed by block 720.

At block 720, a query embedding is generated based on the fresh search term. In some implementations, the query embedding may be generated by providing the fresh search term as input to a machine learning mode, e.g. an ML model trained using method 500.

In some implementations, a different ML model may be utilized to generate the query embedding. Block 720 may be followed by block 730.

At block 730, a respective cosine similarity is determined (calculated) between the query embedding and each of a set of embeddings stored on the online gaming platform. The set of stored embeddings may include a subset of embeddings associated with top searches (top embeddings) on the online gaming platform.

In some implementations, the respective cosine similarity may be computed between the search term and all search terms available on the online gaming platform. In some implementations, the respective cosine similarity may be computed between the search term and a subset of embeddings of search terms. In some implementations, the subset may be determined based on one or more parameters of the user profile (for example, the user profile 200 described with reference to FIG. 2) such as location, language, favorite game(s) of the player, gameplay history, etc. Block 730 may be followed by block 740.

At block 740, one or more top embeddings that are within a threshold cosine similarity from the query embedding of the search term are identified. Block 740 may be followed by block 750.

At block 750, search results are provided to the user that include games associated with each of the one or more top embeddings.

In some implementations, a predetermined number of top embeddings may be configured. For example, when identifying one or more top embeddings that are within a threshold cosine similarity from the query embedding, a predetermined number of top embeddings that are within the threshold cosine similarity from the query embedding. For example, in some implementations, a maximum of 3-5 games may be specified as the maximum number of additional games surfaced by utilizing the query embeddings and method 700

In some implementations, prior to performing a search based on the search term provided by a user, a downranking may be applied to the identified top embeddings so that search results based on the originally provided search term are not suppressed by search results based on the top embeddings. For example, it may be determined by the machine learning model, e.g. based on previously received search session data that the queries "prison life" and "jailbreak" are similar, e.g. the embeddings of terms "prison life" and "jailbreak" lie within a threshold cosine similarity.

If a user inputs a search query "prison life", based on the embeddings, a search engine of the online gaming platform may also search for games associated with "jailbreak" along with games associated with "prison life" and return results from both searches. In this illustrative example, if "Jailbreak" were to be a more popular overall game on the online gaming platform, it may be displayed at a top of a list of returned games relative to "Prison Life" even though the game "Prison Life" is a closer match to the actual term searched. In some implementations, in order to not overwhelm high quality results from the original search query, games returned from related queries (for example, "jailbreak" in this case) may be provided a lower weight than games associated with the original search query.

In some implementations, at least one game associated with the received (original) search term input is returned to the user and included with the search results.

In some implementations, the search results are provided using a user interface that includes the games associated with the one or more top embeddings sorted based on the cosine similarity, such that a game associated with the highest cosine similarity to the search term is listed first in the search results.

In some implementations, the cosine similarity may be computed and the comparison performed based on the language associated with the user. For example, one or more language(s) associated with the user is determined. In some implementations, the language associated with the user may be determined based on the user profile associated with the user. In some implementations, the language associated may be determined based on applying a language detection algorithm to the search term provided by the user.

In some implementations, the plurality of embeddings to be compared may be selected based on the language associated with the user. For example, if the user were to be determined to be a Italian, search terms input by the user may be compared to embeddings of search terms in Italian. In some implementations, if the user were to be determined to be a Italian, search may be compared to embeddings of search terms in English and Italian. Selecting a subset of the available embeddings of search terms may enable reduced computational requirements, and may enable the provision of faster results to the user.

In some implementations, the comparison may be ordered, e.g. based on game popularity. In such an implementation, query embeddings may first be compared to embeddings of search terms associated with popular games before being compared to clusters of search terms associated with less popular games.

Per techniques of this disclosure, use of feedback from successful gameplay sessions may be utilized to analyze search terms to provide search suggestions, and can provide a superior user experience, reduced computational drain on computer systems associated with the online gaming platform, etc.

Improved discovery of games and other content is enabled, even when entered user queries have a high edit distance to the actual term(s) being searched for. This may provide superior performance over conventional spelling auto-correction techniques due to utilization of the feedback loop that associates the incorrectly entered search term(s) with the successfully utilized terms from previous search sessions.

By utilizing disclosed techniques, an online gaming platform may offer a "genre-search" capability—e.g., a search for "sports" may return games relating to basketball and football because previous user search sessions that utilized "sports" as a search term may have been subsequently followed by successful gameplay sessions of games relating to basketball and football.

Blocks 710-750 can be performed (or repeated) in a different order than described above and/or one or more steps can be omitted. For example, in some implementations, method 700 may only be applied to search queries on the online gaming platform search queries for which the results do not meet a performance threshold, e.g., having poor click through rate (CTR), having poor conversion rate of click to play, etc. For example, if a received search term is a search term for which results meet a performance threshold, e.g. has a keyword click through rate (CTR) that meets a predetermined threshold, etc., blocks 720-730 may not be performed. In such a case, only search results corresponding to the entered search term input are returned to the user at block 750.

Figure 8:
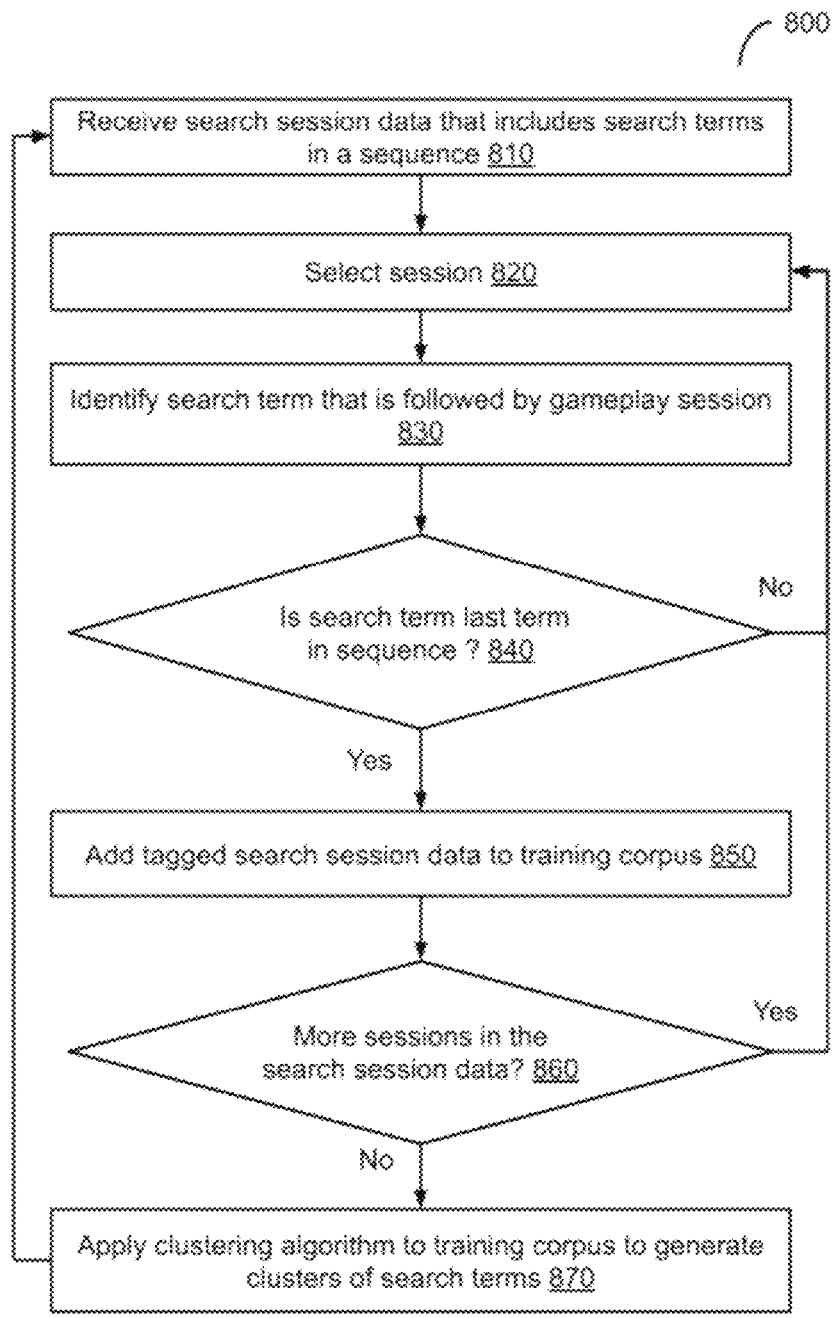
FIG. 8 is a flowchart illustrating an example method to generate clusters of search terms, in accordance with some implementations.

FIG. 8 is a flowchart illustrating an example method 800 to generate clusters of search terms, in accordance with some implementations.

In some implementations, method 800 can be implemented, for example, on gaming server 102 described with reference to FIG. 1. In some implementations, some or all of the method 800 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a database 120 or other storage). In some implementations, different components of one or more servers and/or clients can perform different blocks or other parts of the method 800. In some examples, a first device is described as performing blocks of method 800. Some implementations can have one or more blocks of method 800 performed by one or more other devices (e.g., other client devices or server devices) that can send results or data to the first device.

In some implementations, the method 800, or portions of the method, can be initiated automatically by a system. In some implementations, the implementing system is a first device. For example, the method (or portions thereof) can be periodically performed, or performed based on one or more particular events or conditions, e.g., number of search sessions conducted by users increase by a certain amount, a threshold level of search activity being met, a predetermined time period having expired since the last performance of method 800, and/or one or more other conditions occurring which can be specified in settings read by the method.

Method 800 may begin at block 810. At block 810, search session data for a plurality of search sessions is received. The search session data for each search session may include sequences of search terms of a search session input by a respective user. Block 810 may be followed by block 820, where one of the search sessions is selected. Block 820 may be followed by block 830.

At block 830, a search term in the search session data that is followed by a gameplay session of a game of the online gaming platform is identified. Such a search term may be referred to as a successful search term. In some implementations, gameplay session data is analyzed to detect that the user engaged in the gameplay session of the particular game for at least a threshold time duration.

In some implementations, a particular search term that is followed by a gameplay session is identified as a successful search term when a gameplay session is successfully launched from the results provided in response to the search term and is played by the user. In some implementations, a gameplay session may be considered successfully launched and played if a time duration of play of the gameplay session meets a predetermined threshold time, e.g., 5 minutes. The threshold time may be configurable, and may be based on the game, type of game, category of game, etc. For example, games that are expected to be played only for a relatively short duration may utilize a smaller threshold gameplay time to be considered as a successful gameplay session, and games expected to be played for a relatively longer duration may utilize a larger threshold gameplay time to be considered a successful gameplay session.

In some implementations, a level of user engagement and/or participation may be utilized to determine that a search term is identified based on a gameplay session. For example, identifying that the particular search term of the plurality of search terms is followed by the gameplay session of the particular game may include detecting that the user purchased an item associated with the particular game, provided a rating for the particular game, or customized an avatar in the particular game.

Block 830 may be followed by block 840. At block 840, it is determined whether the successful search term is the last term in a sequence of search terms in the session data. If the successful search term is the last term in the session data, block 840 is followed by block 850.

If it is determined that the successful search term is not the last search term in the sequence (or if the sequence has no successful search term), block 840 may be followed by block 820 to select another search session from the search session data.

In some implementations, when block 840 is followed by block 820, additional operations may be performed on the search session data, prior to executing block 820. In some implementations, only those sequences of search terms are utilized to identify a successful search term that include one or more search terms that are similar to terms associated with the game. For example, a search term is identified if at least one term associated with the particular game, e.g. game name/title, part of the game description, tag associated with the game, etc., is within a threshold distance (information distance or similarity) from one or more of the plurality of search terms.

In some implementations, a search term is included in the sequence of search terms and for clustering (as described below) based on whether a similarity between each pair of consecutive terms of the plurality of terms meets a similarity threshold. For example, such a threshold may be useful to detect a change in user intent, in which case the search session may be broken up into multiple sessions, each corresponding to a different user intent.

In some implementations, each term of the plurality of search terms is associated with a respective timestamp, and wherein a difference in timestamps associated with each pair of consecutive search terms is less than a threshold difference. For example, timestamps within a short time window (e.g., 2 minutes, 5 minutes) may correspond to a search session that has a single goal (intended game) while longer sessions may correspond to multiple different user intents.

In some implementations, if a particular search session does not meet the criteria (e.g., session corresponds to multiple user intents, or is longer than a time window), the sequence of search terms in the search session may be broken into subsequences based on one or more of search term similarity, time window, result of gameplay, etc. The subsequences may each then be classified as a session and added to the search session data, to replace the original session from which they are derived.

For example, a session that includes the sequence {gelprek, gailprek, dukstori, duckstory} may be broken down into two sessions—{gelprek, gailprek} and {dukstori, duckstory} based on the first two terms meeting the similarity threshold, and the second and the third term not meeting the threshold. In another example, a session that includes the sequence {jailbreak (t1=12:00), jailbrake (t2=17:00), jailbreak (t3=17:01)} may be broken into two sessions, one for the first occurrence of the term jailbreak and the second for the sequence {jailbrake, jailbreak} based on a time difference between the first and the second term exceeding a time threshold.

In general, after such processing, each search session (identified in block 820) may include zero (unsuccessful search session) or exactly one successful gameplay session (successful search session) resulting from the search sequence of terms in that session. Further, the unsuccessful search sessions and successful search sessions with a single search term may be excluded from further processing, since these sessions do not add usefully to determination of clusters of search terms, as described below.

At block 850, the search session data (including the sequence of search terms, ending at the successful search term) is added to a training corpus. The search session data is tagged with the particular game that was successfully played in the gameplay session.

In some implementations, other gameplay session data may also be added to the training corpus. For example, information from the user profile(s) associated with the game such as user location, user language, etc. may also be added to the training corpus. Such data may be used as additional factors in generating clusters of search terms. Block 850 may be followed by block 860.

At block 860, it is determined if there are more sessions to be analyzed in the search session data. If it is determined that there are more sessions to be analyzed in the search session data, block 860 is followed by block 820, else processing continues to block 870.

At block 870, a clustering algorithm is applied to the training corpus to generate a plurality of clusters of search terms. Each cluster may include a set of search terms and a particular game associated with the cluster. As described above, the last search term in each search session may correspond to a successful gameplay session and the game for that gameplay session is selected as the particular game associated with the cluster.

In some implementations, clustering may be performed using unsupervised machine learning techniques. In some implementations, the clustering algorithm may utilize a word embedding technique to generate a cluster.

In some implementations, the clustering is performed by a machine learning (ML) model. Sequences of search terms, user profile information, and gameplay session data are provided to a machine learning (ML) model. The ML model generates a set of clusters of search terms based on a current state of the ML model and the provided data. For example, the ML model may determine a feature vector (or embedding) based on features of the sequences of search terms, user profile information, gameplay session data etc. The feature vector (or embedding) may be a mathematical, multi-dimensional representation that is generated. Upon training, the ML model generates embeddings of search terms for each cluster, such that search sessions that resulted in gameplay sessions of the same game are associated with the same cluster.

In some implementations, the ML model may be an ML model that utilizes a word embedding architecture that converts words to vectors. For example, the word embedding architecture may be utilized to map words or phrases that appear in the sequences of search terms to vectors of real numbers.

In some implementations, each cluster of search terms may include a plurality of words. In some implementations, the grouping is performed such that each search term of the search session data is part of a single cluster. Stated in a different way, the grouping is performed such that no search term is in more than one cluster of the plurality of clusters of search terms.

In some implementations, each search term of the search session data may be part of two or more clusters, e.g. a search term may be included in clusters of different games.

Blocks 810-870 can be performed (or repeated) in a different order than described above and/or one or more steps can be omitted.

For example, blocks 870 may be performed for a single search session and the clustering algorithm applied to a single search session data.

In some implementations, multiple search session data may be selected at block 820 and blocks 830-870 may be performed in parallel. Performing some blocks in parallel in this manner may reduce the time to create clusters of search terms, e.g., since multiple search sessions are analyzed substantially at the same time. In some implementations, blocks of method 800 may be performed in the sequence shown in FIG. 8.

In some implementations, method 800 may be performed periodically, e.g., once a day, once a week, etc. and clusters may be updated. In some implementations, method 800 may be performed when certain conditions are satisfied, e.g., when a threshold number of new search sessions are obtained that have not been clustered previously. While FIG. 8 illustrates generation of clusters, it will be understood that when prior clusters are available and new search sessions are analyzed, generating clusters may include updating certain clusters, e.g., to associate additional search terms, or to remove certain search terms, and/or adding new clusters.

For example, when new games are made available on the online gaming platform, users may perform searches for the game, and such searches may be added to a new cluster. In some implementations, if a particular game is no longer available on the online gaming platform, the associated cluster may be removed such that the search terms in that cluster are no longer associated with the particular game.

In some implementations, the search session data may be first divided into groups based on user-language, location, age, etc. and clusters may be derived based on each group. For example, for search session data for search sequences that were subsequently followed by a successful gameplay session of "jailbreak," different clusters may be created for users associated with different languages, e.g. clusters for Spanish-language speakers, clusters for Bengali-language speakers, etc. Different clusters may be created for users in different age groups, for example, users in the age 11-13 range, users in the age 9-10 range, etc. The creation of such clusters enables the customization of spelling corrections based on a likelihood of source of error.

Figure 9:
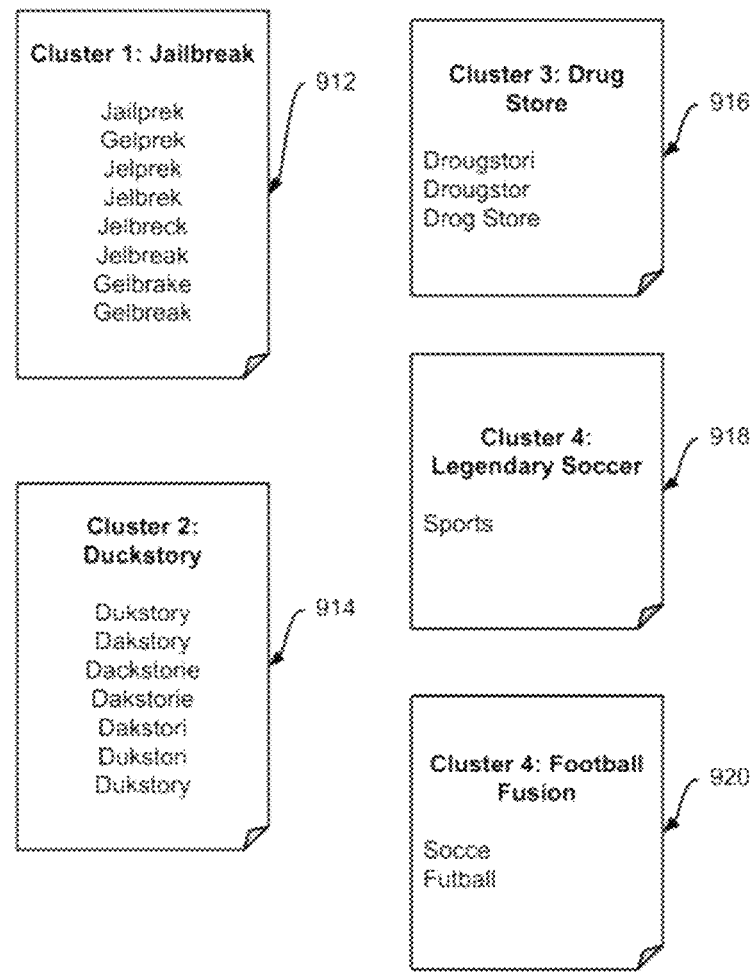
FIG. 9 illustrates examples of game clusters generated from search stream data, in accordance with some implementations.

FIG. 9 is a diagram illustrating examples of game clusters generated from search terms, in accordance with some implementations. The game clusters may be generated, for example, by utilizing method 800, described with reference to FIG. 8.

FIG. 9 depicts example game clusters generated from the sequence of search streams, for example, by using method 800. Each cluster is associated with a game, and includes a set of search terms from the training corpus that are determined by the clustering algorithm.

In this illustrative example, Cluster 1 (912) is associated with the game "Jailbreak" and includes the search terms, "Jailprek," "Gelprek," "Jelprek," "Jelbrek," "Jelbreck," "Jelbreak," "Gelbrake," and "Gelbreak" obtained from search streams 402a-402e.

In this illustrative example, Cluster 2 (914) is associated with the game "Duckstory" and includes a set of corresponding search terms and Cluster 3 (916) is associated with the game "Drug Store" and includes a set of corresponding search terms, obtained from search streams 404a-404b and 406a-406b respectively.

In this illustrative example, Cluster 4 (918) is associated with the game "Legendary Soccer" and includes a corresponding search term and Cluster 5 (920) is associated with the game "Football Fusion" and includes a set of corresponding search terms, obtained from search streams 408 and 410 respectively.

Figure 10:
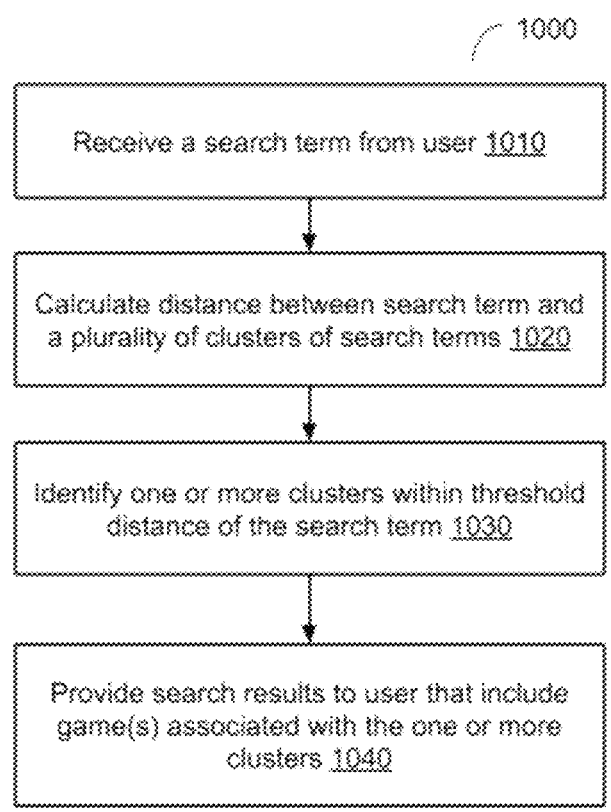
FIG. 10 is a flowchart illustrating another example method to generate search suggestions, in accordance with some implementations.

FIG. 10 is a flowchart illustrating an example method 1000 to generate search suggestions, in accordance with some implementations.

In some implementations, method 1000 can be implemented, for example, on gaming server 102 described with reference to FIG. 1. In some implementations, some or all of the method 1000 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a database 120 or other storage). In some implementations, different components of one or more servers and/or clients can perform different blocks or other parts of the method 1000. In some examples, a first device is described as performing blocks of method 1000. Some implementations can have one or more blocks of method 1000 performed by one or more other devices (e.g., other client devices or server devices) that can send results or data to the first device.

Processing begins at block 1010, where a search term input by a user is received. For example, a user could enter a search query into a game application 112 executing on a client device 110, which transmits the search query to a server (e.g., gaming server 102) resulting in receiving the search query at the server. The search query can include one or more terms or keywords that a user is searching for in a game or game-related content within an online gaming platform or other system. Block 1010 may be followed by block 1020.

At block 1020, a respective distance is computed between the search term and a plurality of clusters of search terms, wherein each cluster is associated with a respective game of the online gaming platform.

In some implementations, the respective distance may be computed between the search term and all clusters of search terms available on the online gaming platform. In some implementations, the respective distance may be computed between the search term and a subset of clusters of search terms. In some implementations, the subset may be determined based on one or more parameters of the user profile (for example, the user profile 200 described with reference to FIG. 2) such as location, language, favorite game(s) of the player, gameplay history, etc.

In some implementations, each cluster may be associated with a metric that enables faster computation of a distance between a search term and the cluster. For example, each cluster may be characterized by its feature vector (embedding) and the computation of the distance between the search term and the cluster may involve a computation of the distance between an embedding generated from the search term and the embedding associated with the cluster.

In some other implementations, the computation of the distance between the search term and the cluster may include computation of a distance between each of the points in the cluster, and computing an average of the computed distances to determine a composite distance between the search term and the cluster. Block 1020 may be followed by block 1030.

At block 1030, one or more clusters that are within a threshold distance of the search term are identified. Block 1030 may be followed by block 1040.

At block 1040, search results are provided to the user that include games associated with each of the one or more clusters.

In some implementations, the search results are provided using a user interface that includes the games associated with each of the one or more clusters sorted based on the computed distance between the search term and the corresponding cluster, such that a game associated with a cluster with the lowest distance (greatest similarity) from the search term is listed first in the search results.

In some implementations, the distance is computed based on the language associated with the user. For example, one or more language(s) associated with the user is determined. In some implementations, the language associated with the user may be determined based on the user profile associated with the user. In some implementations, the language associated may be determined based on applying a language detection algorithm to the search term provided by the user.

In some implementations, a language-specific edit distance between the search term input by the user and respective search terms associated with each cluster of the plurality of clusters is determined.

In some implementations, the language-specific edit distance between the search term input by the user and the respective search terms associated with each cluster of the plurality of clusters may be computed by performing a comparison of the search term input by the user and each search of the respective search term, wherein the comparison is performed after removing a language-specific character substitution pattern associated with the language.

In some implementations, the plurality of clusters are selected based on the language associated with the user. For example, if the user were to be determined to be a Italian, search terms input by the user may be compared to clusters of search terms in Italian. In some implementations, if the user were to be determined to be a Italian, search may be compared to clusters of search terms in English and Italian. Selecting a subset of the available clusters of search terms may enable reduced computational requirements, and may enable the provision of faster results to the user.

In some implementations, the clusters of search terms may be ordered, e.g. based on game popularity. In such an implementation, user provided search terms may first be compared to clusters of search terms associated with popular games before being compared to clusters of search terms associated with less popular games.

Per techniques of this disclosure, use of feedback from successful gameplay sessions may be utilized to analyze search terms to provide search suggestions, and can provide a superior user experience, reduced computational drain on computer systems associated with the online gaming platform, etc.

Improved discovery of games and other content is enabled, even when entered user queries have a high edit distance to the actual term(s) being searched for. This may provide superior performance over conventional spelling auto-correction techniques due to utilization of the feedback loop that associates the incorrectly entered search term(s) with the successfully utilized terms from previous search sessions.

By utilizing disclosed techniques, an online gaming platform may offer a "genre-search" capability—e.g., a search for "sports" may return games relating to basketball and football because previous user search sessions that utilized "sports" as a search term may have been subsequently followed by successful gameplay sessions of games relating to basketball and football.

In some implementations, a computer-implemented method includes receiving search session data for a plurality of search sessions, each search session comprising a plurality of search terms input by a respective user, wherein the plurality of search terms of the search session are in a sequence.

In some implementations, the method further includes for each search session, identifying that a particular search term of the plurality of search terms is followed by a gameplay session of a particular game of a plurality of games of an online gaming platform, determining that the particular search term is a successful term when the particular search term is a last search term in the sequence, and in response to the determining, adding the search session data to a training corpus, the search session data tagged with the particular game, and applying a clustering algorithm to the training corpus to generate a plurality of clusters of search terms, each cluster including a respective set of search terms and each cluster associated with a respective game of the online gaming platform.

In some implementations, identifying that the particular search term of the plurality of search terms is followed by the gameplay session of the particular game includes detecting that the user engaged in the gameplay session of the particular game for at least a threshold time duration.

In some implementations, at least one term associated with the particular game is within a threshold distance from one or more of the plurality of search terms. In some implementations, identifying that the particular search term of the plurality of search terms is followed by the gameplay session of the particular game includes detecting that the user purchased an item associated with the particular game, provided a rating for the particular game, or customized an avatar in the particular game.

In some implementations, the method further includes receiving search input that includes a fresh search term, comparing the fresh search term with each of the plurality of clusters of search terms to obtain one or more search results, each search result indicative of a corresponding game of the plurality of games, and providing the search results in response to the search input.

In some implementations, each term of the plurality of search terms is associated with a respective timestamp, and a difference in timestamps associated with each pair of consecutive search terms is less than a threshold difference.

In some implementations, a similarity between each pair of consecutive terms of the plurality of terms meets a similarity threshold.

In some implementations, determining that the particular search term is a successful term includes determining that the particular search term is a last search term in the sequence and when no other search term of the plurality of search terms is followed by the gameplay session.

Some implementations include a computer-implemented method that includes receiving a search term input by a user, calculating a respective distance between the search term and a plurality of clusters of search terms, each cluster associated with a respective game of a plurality of games of an online gaming platform, identifying one or more clusters that are within a threshold distance of the search term, and providing search results that include games associated with each of the one or more clusters.

In some implementations, providing search results includes providing a user interface that includes the games associated with each of the one or more clusters sorted based on the distance, such that a game with the lowest distance from the search term is listed first in the search results.

In some implementations, the method further includes determining a language associated with the user, wherein calculating the distance is based on the language associated with the user.

In some implementations, calculating the distance includes determining a language-specific edit distance between the search term input by the user and respective search terms associated with each cluster of the plurality of clusters of search terms.

In some implementations, determining the language-specific edit distance between the search term input by the user and the respective search terms associated with each cluster of the plurality of clusters of search terms comprises performing a comparison of the search term input by the user and each search of the respective search term, wherein the comparison is performed after removing a language-specific character substitution pattern associated with the language.

In some implementations, the method further includes determining a language associated with the user, wherein the plurality of clusters of search terms are selected based on the language.

Some implementations include a non-transitory computer-readable medium comprising instructions that, responsive to execution by a processing device, causes the processing device to perform operations that include receiving a search term input by a user, calculating a respective distance between the search term and a plurality of clusters of search terms, each cluster associated with a respective game of a plurality of games of an online gaming platform, identifying one or more clusters that are within a threshold distance of the search term, and providing search results that include games associated with each of the one or more clusters.

Figure 11A:
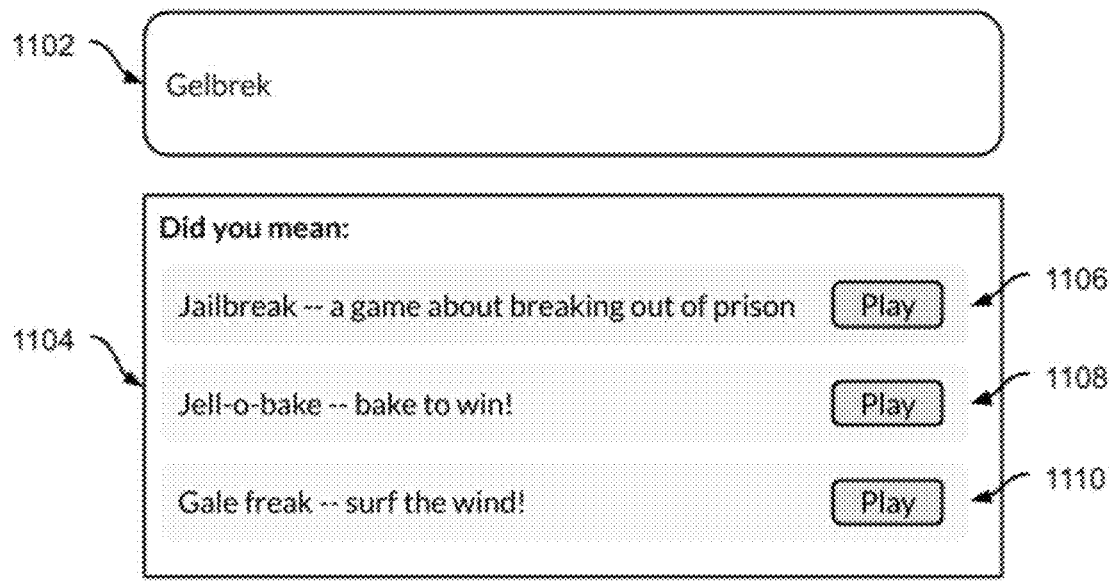
FIG. 11A illustrates an example of a user interface to provide search suggestions based on a search term, in accordance with some implementations.

FIG. 11A depicts an example user interface utilized to provide search suggestions based on a search term, in accordance with some implementations.

In this example, a user searched for "Gelbrek" via user interface element 1102. Based on the entered search term, game suggestions may be provided to the user via user interface 1104. In some implementations, an option may be provided to the user to select any of the suggested games for gameplay.

In some implementations, the search results may be presented in an ordered manner such that a top result is a game that was identified to be associated with the embeddings determined to have the greatest cosine similarity to the query embedding (embedding associated with the search term). In this illustrative example, the game 'Jailbreak" 1106 is presented as the top result. The search suggestions may also include other games associated with embeddings that lie within a threshold cosine similarity from the search term "Gelbrek." In this illustrative example, games "Jell-o-bake" 1108 and "Gale freak" 1110 are also suggested to the user, based on cosine similarity to the search term, as explained above with reference to FIGS. 7 and 10.

As described earlier, the user interface may enable a user to initiate a gameplay session of the game suggestions provided to the user.

Figure 11B:
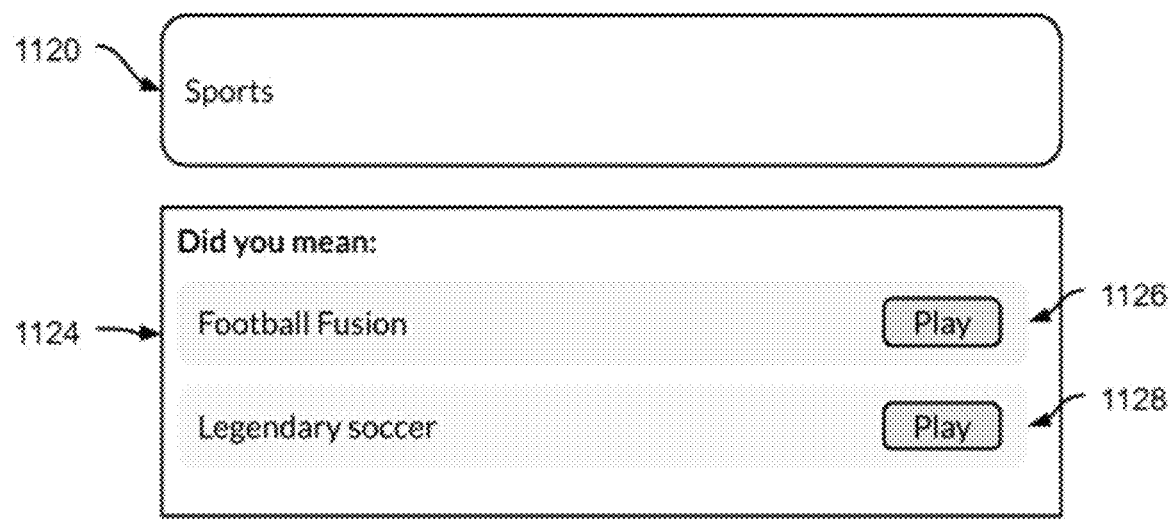
FIG. 11B illustrates another example of a user interface to provide search suggestions based on a search term, in accordance with some implementations.

FIG. 11B depicts another example user interface utilized to provide search suggestions based on a search term, in accordance with some implementations. The search terms may also be terms that are associated with a category or genre of a game rather than with the title, description, etc. This enables the online gaming platform to suggest games based on a user intent to play a certain type of game, even when they may not be aware of game details such as title, description, etc. as long as the cosine similarity of the embedding of the search term and embeddings of search terms previously used on the online gaming platform and associated with a game of that type meet a threshold similarity.

The cosine similarity of embeddings may meet a threshold similarity based on the search terms being semantically similar, similar in typing, similar due to a translated meaning, etc.

In this example, a user searched for "Sports" via user interface element 1120. Based on the entered search term, game suggestions may be provided to the user via user interface 1124. In this illustrative example, the games "Football Fusion" 1122 and "Legendary Soccer" 1128 are suggested to the user.

Figure 12:
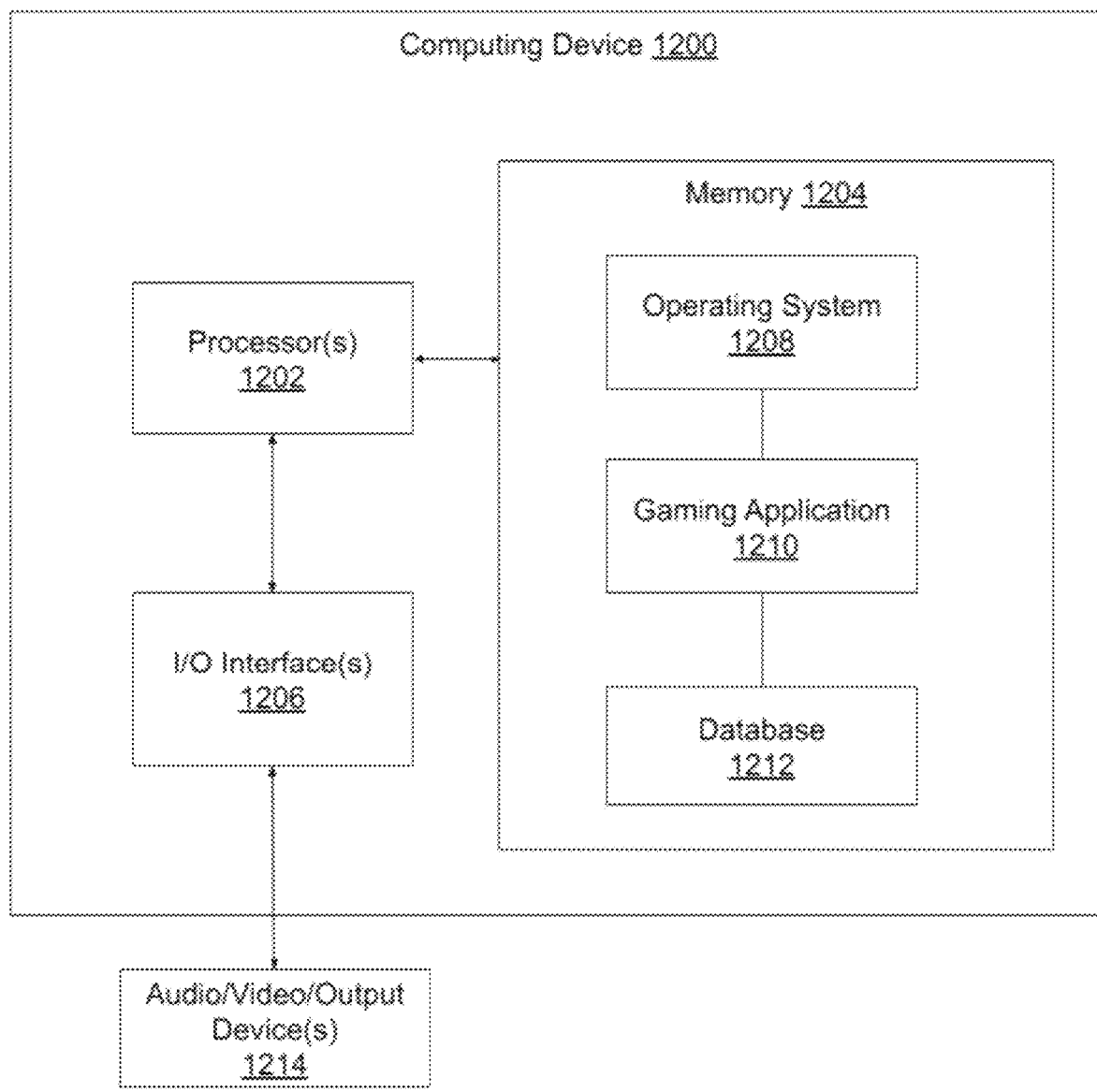
FIG. 12 is a block diagram illustrating an example computing device, in accordance with some implementations.

FIG. 12 is a block diagram of an example computing device 1200 which may be used to implement one or more features described herein. In one example, device 1200 may be used to implement a computer device (e.g. 102 and/or 110 of FIG. 1), and perform appropriate method implementations described herein. Computing device 1200 can be any suitable computer system, server, or other electronic or hardware device. For example, the computing device 1200 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1200 includes a processor 1202, a memory 1204, input/output (I/O) interface 1206, and audio/video input/output devices 1214.

Processor 1202 can be one or more processors and/or processing circuits to execute program code and control basic operations of the device 1200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1204 is typically provided in device 1200 for access by the processor 1202, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1202 and/or integrated therewith. Memory 1204 can store software operating on the server device 1200 by the processor 1202, including an operating system 1208, one or more applications 1210, e.g., an audio spatialization application and application data 1212. In some implementations, application 1210 can include instructions that enable processor 1202 to perform the functions (or control the functions of) described herein, e.g., some or all of the methods described with respect to FIGS. 5, 7, 8, and 10.

For example, applications 1210 can include an audio spatialization module 1212, which as described herein can provide audio spatialization within an online gaming server (e.g., 102). Elements of software in memory 1204 can alternatively be stored on any other suitable storage location or computer-readable medium. In addition, memory 1204 (and/or other connected storage device(s)) can store instructions and data used in the features described herein. Memory 1204 and any other type of storage (magnetic disk, optical disk, magnetic tape, or other tangible media) can be considered "storage" or "storage devices."

I/O interface 1206 can provide functions to enable interfacing the server device 1200 with other systems and devices. For example, network communication devices, storage devices (e.g., memory and/or data store 120), and input/output devices can communicate via interface 1206. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 1214 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 12 shows one block for each of processor 1202, memory 1204, I/O interface 1206, and software blocks 1208 and 1210. These blocks may represent one or more processors or processing circuitries, operating systems, memories, I/O interfaces, applications, and/or software engines. In other implementations, device 1200 may not have all of the components shown and/or may have other elements including other types of elements instead of, or in addition to, those shown herein. While the online gaming server 102 is described as performing operations as described in some implementations herein, any suitable component or combination of components of online gaming server 102 or similar system, or any suitable processor or processors associated with such a system, may perform the operations described.

A user device can also implement and/or be used with features described herein. Example user devices can be computer devices including some similar components as the device 1200, e.g., processor(s) 1202, memory 1204, and I/O interface 1206. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 1214, for example, can be connected to (or included in) the device 1200 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 500, 700, 800, and/or 1000) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

In addition to the foregoing description, users of the online gaming platform are provided with controls that enable the user to select if and when systems, programs, or features described herein may enable collection of user information, e.g., user profile information, user gameplay session data, information obtained from device sensors of a user device, a user's chat data, a user's preferences, a user's current location. The user can selectively deny permission for various types of user data. User data is used only as permitted by the user. Further, user data may be processed before it is stored and/or used. For example, such processing can ensure that personally identifiable information is removed from the user data. For example, a user's identity may be treated so that no personally identifiable information can be determined for the user. In another example, geographic location is generalized where location information is obtained (such as to a city, ZIP code, or state level), so that a particular location cannot be determined. Thus, the user is provided with control over what information is collected about the user, how that information is used, and what information is provided to the user.

What is claimed is:

1. A computer-implemented method comprising:
    receiving search session data for a plurality of search sessions, each search session comprising a plurality of search terms input by a respective user, wherein the plurality of search terms of the search session are in a sequence;
    for each search session,
        identifying that a particular search term of the plurality of search terms is followed by a gameplay session of a particular game of a plurality of games of an online gaming platform;
        determining that the particular search term is a successful term when the particular search term is a last search term in the sequence; and
        in response to the determining, adding the search session data to a training corpus; and
    applying a machine learning algorithm to the training corpus to generate a plurality of embeddings of search terms, each embedding corresponding to a particular search term of the plurality of search terms.

2. The computer-implemented method of claim 1, wherein identifying that the particular search term of the plurality of search terms is followed by the gameplay session of the particular game comprises detecting that the user engaged in the gameplay session of the particular game for at least a threshold time duration.

3. The computer-implemented method of claim 1, further comprising selecting a plurality of top embeddings, wherein the plurality of top embeddings is a subset of embeddings of search terms of the plurality of search terms.

4. The computer-implemented method of claim 3, further comprising:
  receiving search input that includes a fresh search term;
  generating a query embedding based on the fresh search term;
  comparing the query embedding with the plurality of top embeddings to obtain one or more search results, each search result indicative of a corresponding game of the plurality of games; and
  providing the search results in response to the search input.

5. The computer-implemented method of claim 1, wherein identifying that the particular search term of the plurality of search terms is followed by the gameplay session of the particular game comprises detecting that the user purchased an item associated with the particular game, provided a rating for the particular game, or customized an avatar in the particular game.

6. The computer-implemented method of claim 1, wherein each term of the plurality of search terms is associated with a respective timestamp, and wherein a difference in timestamps associated with each pair of consecutive search terms is less than a threshold difference.

7. The computer-implemented method of claim 1, wherein applying the machine learning algorithm comprises applying the machine learning algorithm to a plurality of n-grams constructed from the plurality of search terms.

8. The computer-implemented method of claim 1, wherein applying the machine learning algorithm comprises shuffling the search terms associated with the search session prior to applying the machine learning algorithm.

9. The computer-implemented method of claim 1, wherein each embedding is a multi-dimensional numerical feature vector associated with the search term.

10. The computer-implemented method of claim 1, wherein each embedding has a dimension between about 100 and about 400.

11. The computer-implemented method of claim 1, wherein determining that the particular search term is a successful term comprises determining that the particular search term is a last search term in the sequence and when no other search term of the plurality of search terms is followed by the gameplay session.

12. The computer-implemented method of claim 1, wherein embeddings of search terms that are followed by a gameplay session of the same game have a cosine similarity greater than embeddings of search terms that are followed by gameplay sessions of different games.

13. A computer-implemented method comprising:
  receiving a search term input by a user;
  generating a query embedding for the search term input;
  calculating a respective cosine similarity between the query embedding and a plurality of top embeddings;
  identifying one or more top embeddings that are within a threshold cosine similarity from the query embedding; and
  providing search results that include games associated with the one or more top embeddings.

14. The computer-implemented method of claim 13, wherein providing search results comprises providing a user interface that includes the games associated with the one or more top embeddings sorted based on the cosine similarity.

15. The computer-implemented method of claim 13, further comprising:
  prior to generating the query embedding for the search term input, verifying that a click through rate associated with the search term input meets a predetermined threshold.

16. The computer-implemented method of claim 13, wherein each query embedding is a multi-dimensional numerical feature vector associated with the search term input.

17. A non-transitory computer-readable medium comprising instructions that, responsive to execution by a processing device, causes the processing device to perform operations comprising:
  receiving a search term input by a user;
  generating a query embedding for the search term input;
  calculating a respective cosine similarity between the query embedding and a plurality of top embeddings;
  identifying one or more top embeddings that are within a threshold cosine similarity from the query embedding; and
  providing search results that include games associated with the one or more top embeddings.

18. The non-transitory computer-readable medium of claim 17, wherein providing search results comprising providing a user interface that includes the games associated with each of the one or more top embeddings sorted based on the cosine similarity.

19. The non-transitory computer-readable medium of claim 17, wherein the operations further comprise:
  prior to generating the query embedding for the search term input, verifying that a click through rate associated with the search term input meets a predetermined threshold.

20. The non-transitory computer-readable medium of claim 17, wherein each query embedding is a multi-dimensional numerical feature vector associated with the search term input.

* * * * *